(12) United States Patent
Tajima et al.

(10) Patent No.: US 10,341,041 B2
(45) Date of Patent: Jul. 2, 2019

(54) METHOD AND DEVICE FOR ASSISTING WAVELENGTH REALLOCATION IN WAVELENGTH DIVISION MULTIPLEXING OPTICAL NETWORK

(71) Applicant: FUJITSU LIMITED, Kawasaki-shi, Kanagawa (JP)

(72) Inventors: Kazuyuki Tajima, Yokosuka (JP); Yutaka Takita, Kawasaki (JP); Tomohiro Hashiguchi, Inagi (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/487,703

(22) Filed: Apr. 14, 2017

(65) Prior Publication Data
US 2017/0359142 A1 Dec. 14, 2017

(30) Foreign Application Priority Data
Jun. 9, 2016 (JP) .................................. 2016-115642

(51) Int. Cl.
*H04J 14/02* (2006.01)
*H04B 10/27* (2013.01)

(52) U.S. Cl.
CPC .......... *H04J 14/0227* (2013.01); *H04B 10/27* (2013.01); *H04J 14/0241* (2013.01)

(58) Field of Classification Search
CPC ........................... H04B 10/27; H04J 14/0227
See application file for complete search history.

(56) References Cited

U.S. PATENT DOCUMENTS

| 2013/0195460 | A1 | 8/2013 | Kadohata et al. |
| 2016/0352452 | A1* | 12/2016 | Takeshita ............ H04J 14/0267 |
| 2017/0104632 | A1* | 4/2017 | Kim .................... H04L 41/0826 |
| 2017/0302370 | A1* | 10/2017 | Fujisawa ................ H04B 10/03 |
| 2018/0115384 | A1* | 4/2018 | Wright ................ H04J 14/0257 |

FOREIGN PATENT DOCUMENTS

JP  2012-109928  6/2012

* cited by examiner

*Primary Examiner* — Dzung D Tran
(74) *Attorney, Agent, or Firm* — Fujitsu Patent Center

(57) ABSTRACT

A wavelength reallocation assisting method provides information relating to wavelength allocation to optical lines in a wavelength division multiplexing optical network in which a plurality of nodes are connected by optical fibers. The wavelength reallocation assisting method includes: outputting first allocation state information that indicates a sum of bandwidths of respective wavelength slots used by at least one of the optical lines among a plurality of wavelength slots that are available in the wavelength division multiplexing optical network; and outputting second allocation state information that indicates a maximum value of individual used bandwidths obtained with respect to the respective optical fibers, each of the individual used bandwidths indicating a sum of bandwidths of wavelength slots allocated to corresponding optical lines established in a corresponding optical fiber.

5 Claims, 30 Drawing Sheets

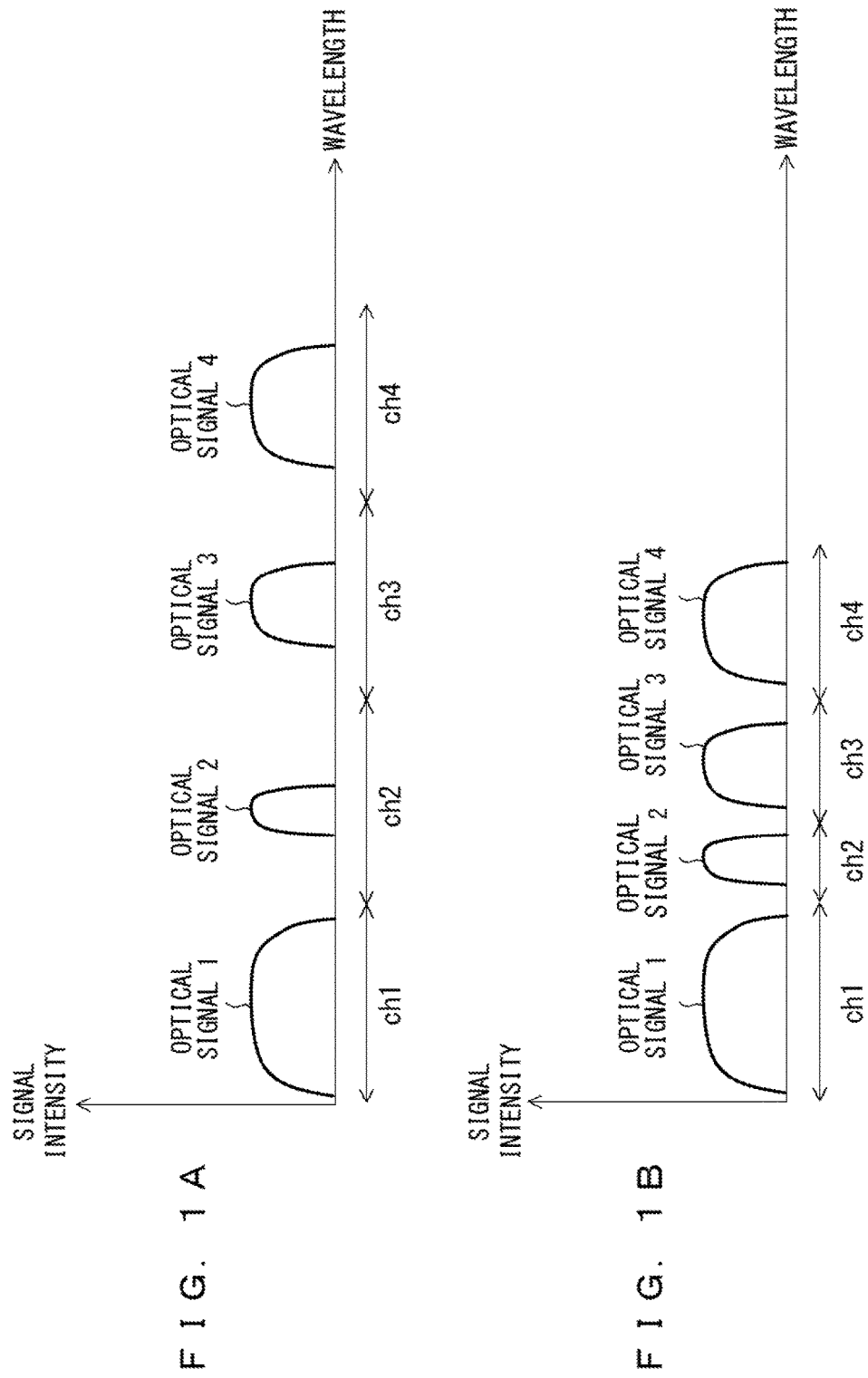

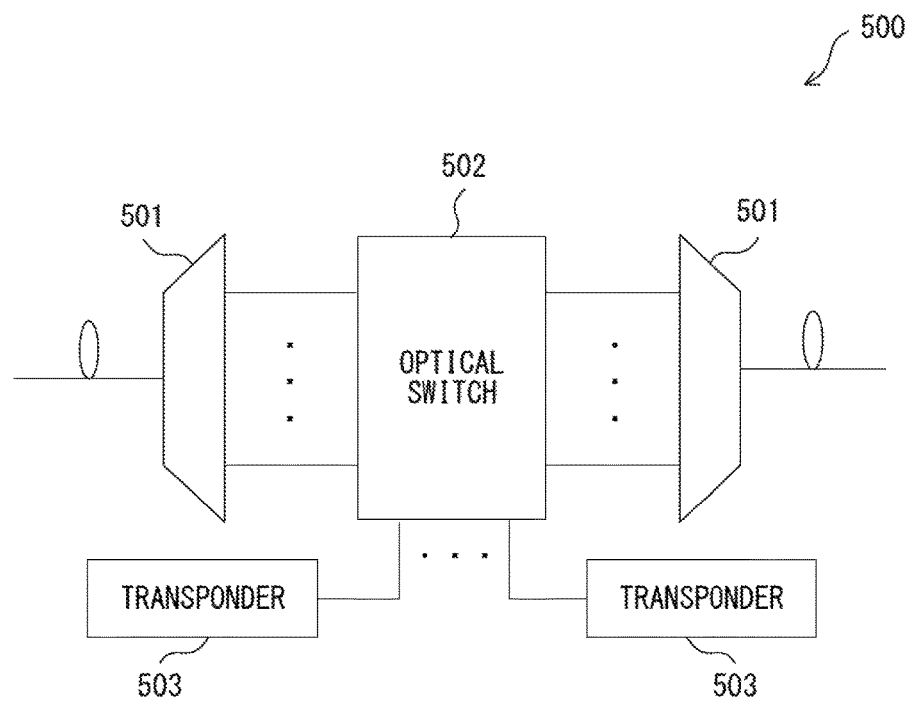
F I G. 2

FIG. 5A

WAVELENGTH SLOT

| S4 | | | |
| S3 | | | |
| S2 | | OPTICAL LINE #4 | |
| S1 | OPTICAL LINE #1 | OPTICAL LINE #2 | OPTICAL LINE #3 |
| | FIBER BETWEEN A AND B | FIBER BETWEEN B AND C | FIBER BETWEEN C AND D |

FIG. 5B

WAVELENGTH SLOT

| S4 | | | |
| S3 | | | |
| S2 | | OPTICAL LINE #4 | |
| S1 | OPTICAL LINE #1 | | OPTICAL LINE #3 |
| | FIBER BETWEEN A AND B | FIBER BETWEEN B AND C | FIBER BETWEEN C AND D |

FIG. 5C

WAVELENGTH SLOT

| S4 | | | |
| S3 | | OPTICAL LINE #5 | |
| S2 | | OPTICAL LINE #4 | |
| S1 | OPTICAL LINE #1 | | OPTICAL LINE #3 |
| | FIBER BETWEEN A AND B | FIBER BETWEEN B AND C | FIBER BETWEEN C AND D |

FIG. 5D

WAVELENGTH SLOT

| S4 | | | |
| S3 | | | |
| S2 | | OPTICAL LINE #4 | OPTICAL LINE #3 |
| S1 | OPTICAL LINE #1 | OPTICAL LINE #5 | |
| | FIBER BETWEEN A AND B | FIBER BETWEEN B AND C | FIBER BETWEEN C AND D |

F I G. 6A
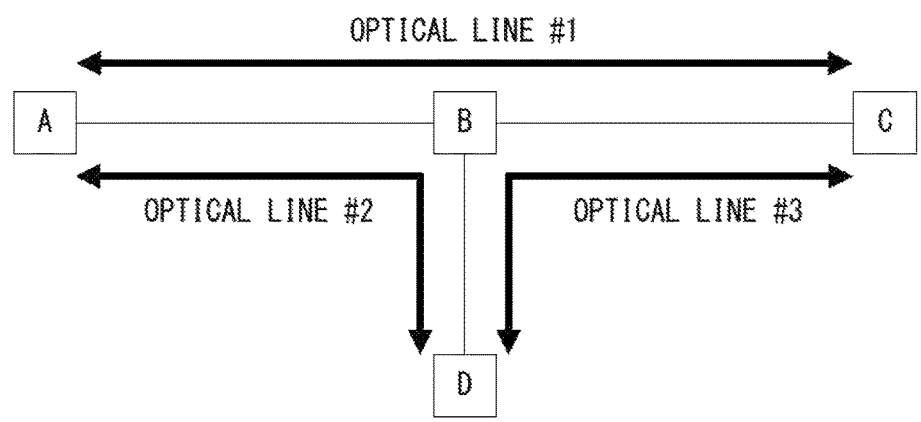
F I G. 6B
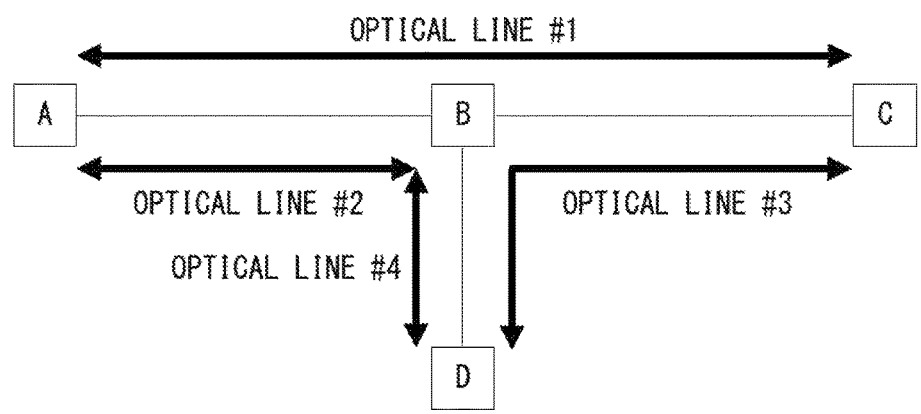

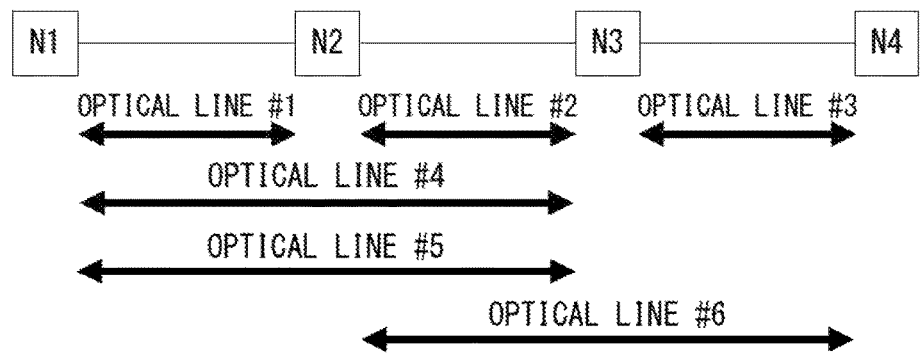
F I G. 9

FIG. 10A

| NODE NAME |
|---|
| N1 |
| N2 |
| N3 |
| N4 |

FIG. 10B

| START POINT NODE | END POINT NODE | NUMBER OF WAVELENGTHS |
|---|---|---|
| N1 | N2 | 40 |
| N2 | N3 | 40 |
| N3 | N4 | 40 |

| LINE ID | START POINT NODE | END POINT NODE | BANDWIDTH | WAVELENGTH SLOT NUMBER | ROUTE |
|---|---|---|---|---|---|
| 1 | N1 | N2 | 1 | 1 | N1, N2 |
| 2 | N2 | N3 | 1 | 2 | N2, N3 |
| 3 | N3 | N4 | 1 | 1 | N3, N4 |
| 4 | N1 | N3 | 2 | 3 | N1, N2, N3 |
| 5 | N1 | N3 | 1 | 6 | N1, N2, N3 |
| 6 | N2 | N4 | 1 | 5 | N2, N3, N4 |

FIG. 12

| WAVELENGTH SLOT NUMBER | FIBER BETWEEN N1 AND N2 | FIBER BETWEEN N2 AND N3 | FIBER BETWEEN N3 AND N4 |
|---|---|---|---|
| 1 | true | false | true |
| 2 | false | true | false |
| 3 | true | true | false |
| 4 | true | true | false |
| 5 | false | true | true |
| 6 | true | true | false |

FIG. 14

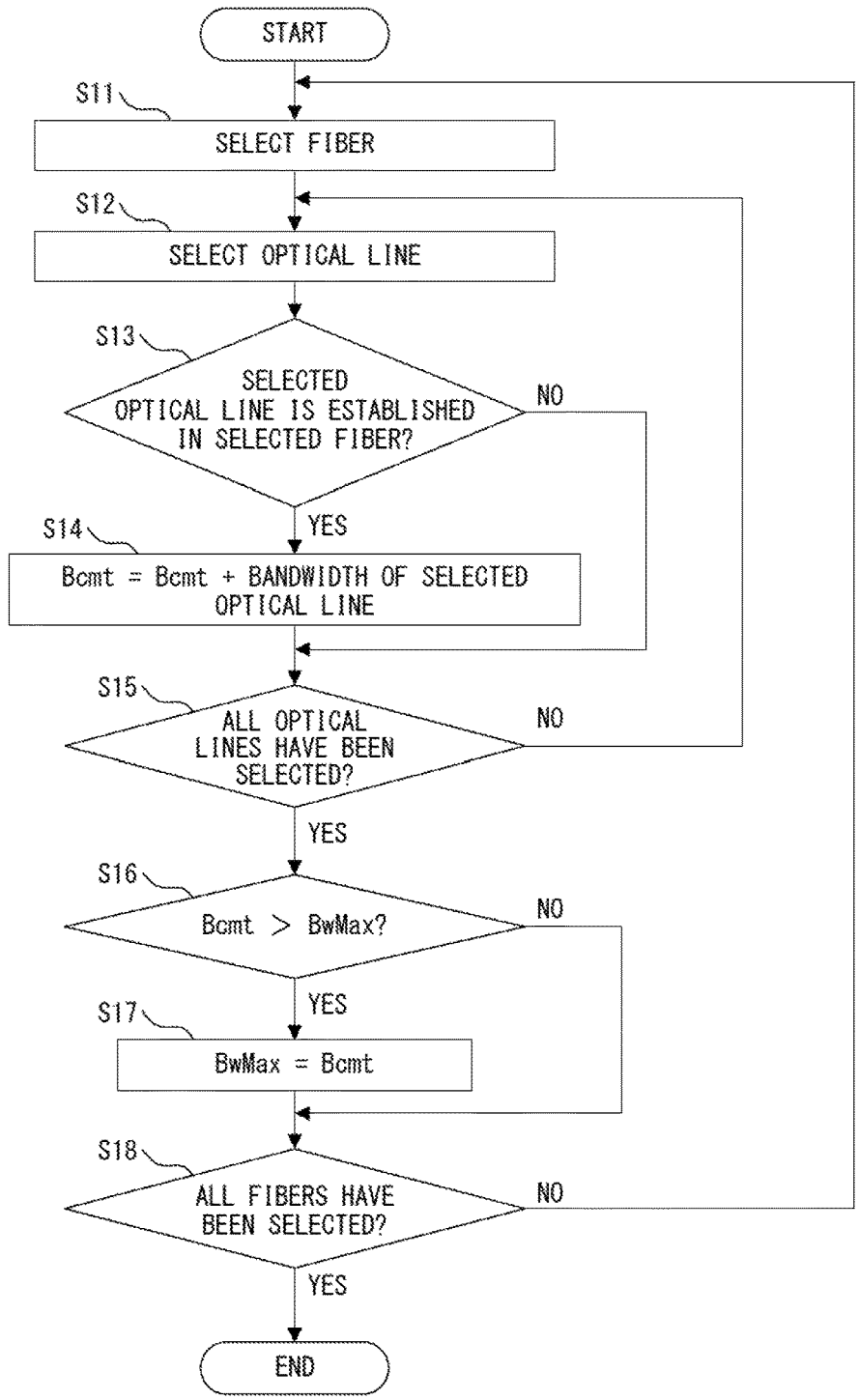
F I G. 1 5

F I G. 20A
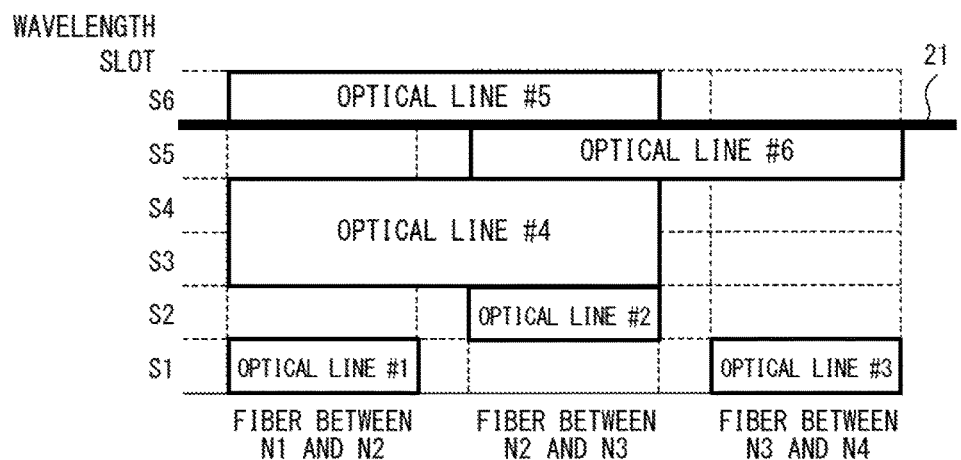
F I G. 20B
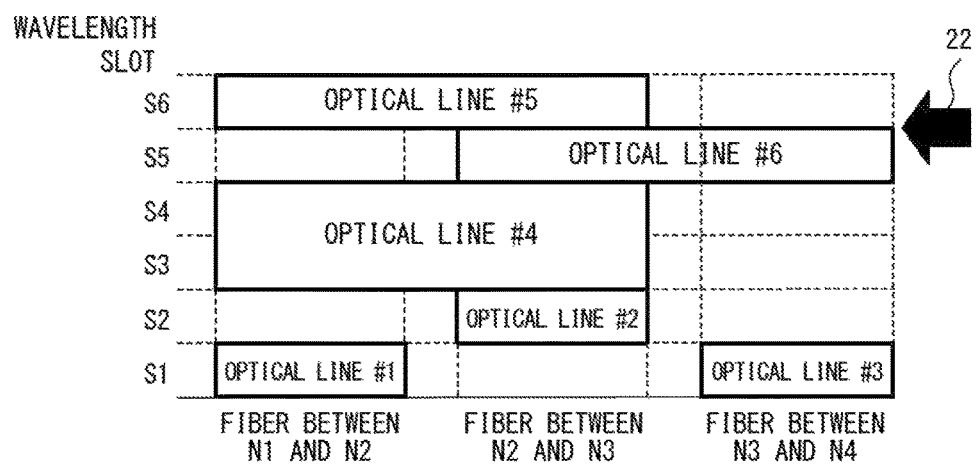

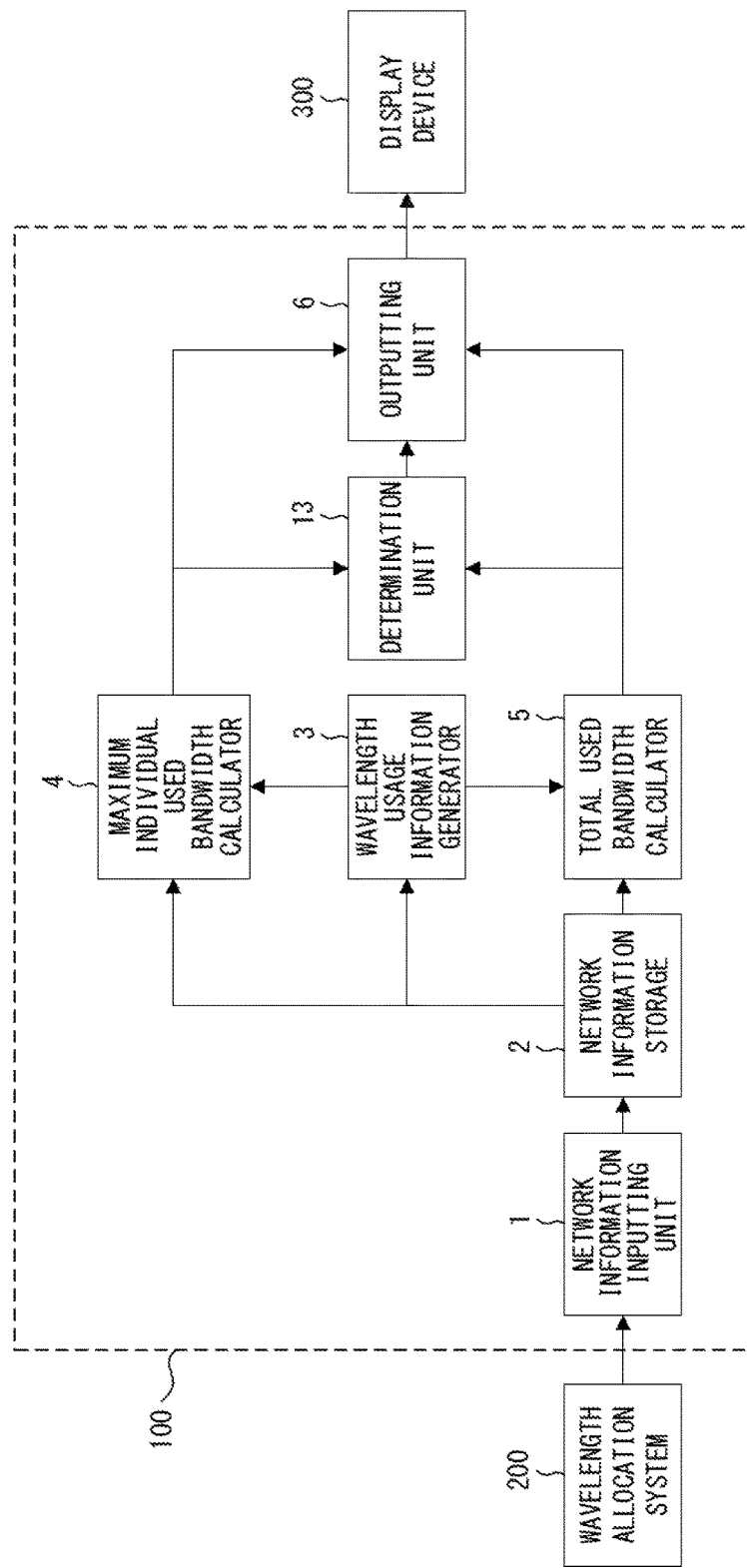
F I G. 21

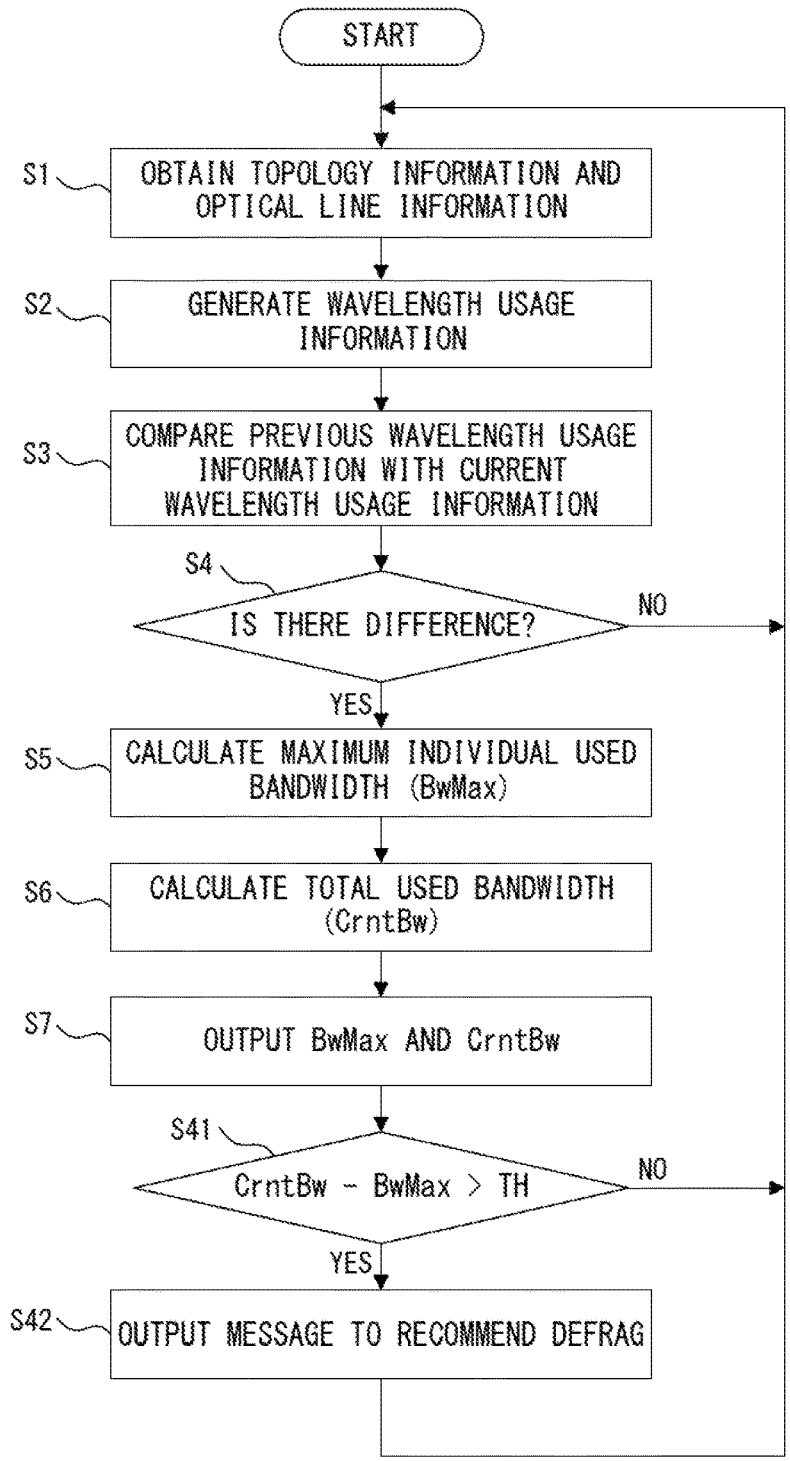
F I G. 22

|     | #1 | #2 | #3 | #4 | #5 | #6 |
| --- | --- | --- | --- | --- | --- | --- |
| #1  | –  | 0  | 0  | 1  | 1  | 0  |
| #2  | 0  | –  | 0  | 1  | 1  | 1  |
| #3  | 0  | 0  | –  | 0  | 0  | 1  |
| #4  | 1  | 1  | 0  | –  | 1  | 1  |
| #5  | 1  | 1  | 0  | 1  | –  | 1  |
| #6  | 0  | 1  | 1  | 1  | 1  | –  |

WAVELENGTH SLOT

| | | | |
|---|---|---|---|
| S40 | OPTICAL LINE #1 | | OPTICAL LINE #3 |
| S39 | | OPTICAL LINE #2 | |
| S38 | OPTICAL LINE #4 | | |
| S37 | | | |
| S36 | | OPTICAL LINE #6 | |
| S35 | OPTICAL LINE #5 | | |
| | FIBER BETWEEN N1 AND N2 | FIBER BETWEEN N2 AND N3 | FIBER BETWEEN N3 AND N4 |

F I G. 2 9 B

VIRTUAL SLOT NUMBER

| | | | |
|---|---|---|---|
| 6 | OPTICAL LINE #5 | | |
| 5 | | OPTICAL LINE #6 | |
| 4 | OPTICAL LINE #4 | | |
| 3 | | | |
| 2 | | OPTICAL LINE #2 | |
| 1 | OPTICAL LINE #1 | | OPTICAL LINE #3 |
| | FIBER BETWEEN N1 AND N2 | FIBER BETWEEN N2 AND N3 | FIBER BETWEEN N3 AND N4 |

METHOD AND DEVICE FOR ASSISTING WAVELENGTH REALLOCATION IN WAVELENGTH DIVISION MULTIPLEXING OPTICAL NETWORK

CROSS-REFERENCE TO RELATED APPLICATION

This application is based upon and claims the benefit of priority of the prior Japanese Patent Application No. 2016-115642, filed on Jun. 9, 2016, the entire contents of which are incorporated herein by reference.

FIELD

The embodiments discussed herein are related to a method and a device for assisting wavelength reallocation in a wavelength division multiplexing optical network.

BACKGROUND

When optical lines are accommodated by using wavelength division multiplexing (WDM), an operation management system allocates wavelengths to the respective optical lines. A process for allocating wavelengths to optical lines to be allocated is referred to as wavelength allocation design. Note that an "optical line" in the description below corresponds to an optical path (or a wavelength path) that is established between two nodes.

In the wavelength allocation design, wavelengths are allocated to respective optical lines that are established on each optical fiber in such a way that the wavelengths of the respective optical lines are different from each other. In addition, in order to suppress the cost of a network, the same wavelength is used on a route from a start point node to an end point node in many cases.

Conventionally, when an optical line is established in order to provide a certain communication service, the optical line is not deleted until the service is terminated. However, in recent years, an operation form in which an optical line of a needed bandwidth is established as needed has been widely used due to, for example, software defined networking (SDN). Namely, an optical line may be frequently added or deleted. Therefore, even in a case in which wavelengths are allocated to respective optical lines in such away that wavelength usage efficiency is high at a particular point in time, when an optical line is added or deleted afterward, the wavelength usage efficiency may decrease. Accordingly, an operation is requested in which the wavelength usage efficiency is monitored, and when the wavelength usage efficiency decreases, wavelength allocation to the respective optical lines is changed. Note that an action to change wavelength allocation during operation may be referred to as wavelength reallocation or defragmentation (or simply referred to as "defrag").

As a related technology, a wavelength path reallocation method for designing wavelength paths in such a way that a used frequency area becomes smaller than before reallocation has been proposed (for example, US Patent Publication No. 2013/0195460).

An optical signal modulation scheme is selected according to transmission distance, requested quality, or the like. In a WDM optical network, optical signals of different modulation schemes may be multiplexed. In the example illustrated in FIG. 1A, the modulation schemes of optical signal 1 to optical signal 4 that are multiplexed into a WDM optical signal are different from each other. Here, a bandwidth needed to transmit each of the optical signals (hereinafter, this may be referred to as a "modulation bandwidth" or may be simply referred to as a "bandwidth") depends on a modulation scheme. In addition, in order to improve wavelength usage efficiency, the variable wavelength spacing scheme in which optical signals can be arranged at a desired wavelength spacing has been proposed, as illustrated in FIG. 1B. Note that the wavelength usage efficiency can be improved in the variable wavelength spacing scheme in comparison with the fixed wavelength spacing scheme illustrated in FIG. 1A. Further, the network topology of a long-distance transmission network is simple, but many nodes are connected complicatedly in a metropolitan area network. Namely, the network topology of the metropolitan area network is complicated.

As described above, in a WDM optical network in which network topology is complicated and modulation bandwidths allocated to respective optical lines are not constant, it is difficult to determine whether the wavelength usage efficiency is high or low. Namely, it is difficult to determine whether it is preferable that wavelength reallocation be performed in the WDM optical network.

SUMMARY

According to an aspect of the present invention, a wavelength reallocation assisting method provides information relating to wavelength allocation to optical lines in a wavelength division multiplexing optical network in which a plurality of nodes are connected by optical fibers. The wavelength reallocation assisting method includes: outputting first allocation state information that indicates a sum of bandwidths of respective wavelength slots used by at least one of the optical lines among a plurality of wavelength slots that are available in the wavelength division multiplexing optical network; and outputting second allocation state information that indicates a maximum value of individual used bandwidths obtained with respect to the respective optical fibers, each of the individual used bandwidths indicating a sum of bandwidths of wavelength slots allocated to corresponding optical lines established in a corresponding optical fiber.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 1A and 1B illustrate examples of a wavelength multiplexed optical signal.

FIG. 2 illustrates an example of an optical add-drop multiplexer installed in each node.

FIGS. 5A-5D illustrate examples of wavelength allocation to the optical lines illustrated in FIG. 4.

FIGS. 6A and 6B illustrate other examples of optical lines that are established in a WDM optical network.

FIG. 9 illustrates an example of network topology and examples of established optical lines.

FIGS. 10A and 10B illustrate an example of topology information.

FIG. 12 illustrates an example of optical line information.

FIG. 14 illustrates an example of wavelength usage information.

FIG. 15 is a flowchart illustrating an example of a method for calculating a maximum individual used bandwidth.

FIGS. 20A and 20B illustrate display examples of wavelength usage information according to the second embodiment.

FIG. 21 illustrates an example of a wavelength reallocation assist device according to a third embodiment.

FIG. 22 is a flowchart illustrating an example of a wavelength reallocation assisting method according to the third embodiment.

FIG. 24 illustrates an example of a constraint condition table.

FIGS. 29A and 29B illustrate an example of conversion of wavelength slot numbers.

DESCRIPTION OF EMBODIMENTS

Figure 3:
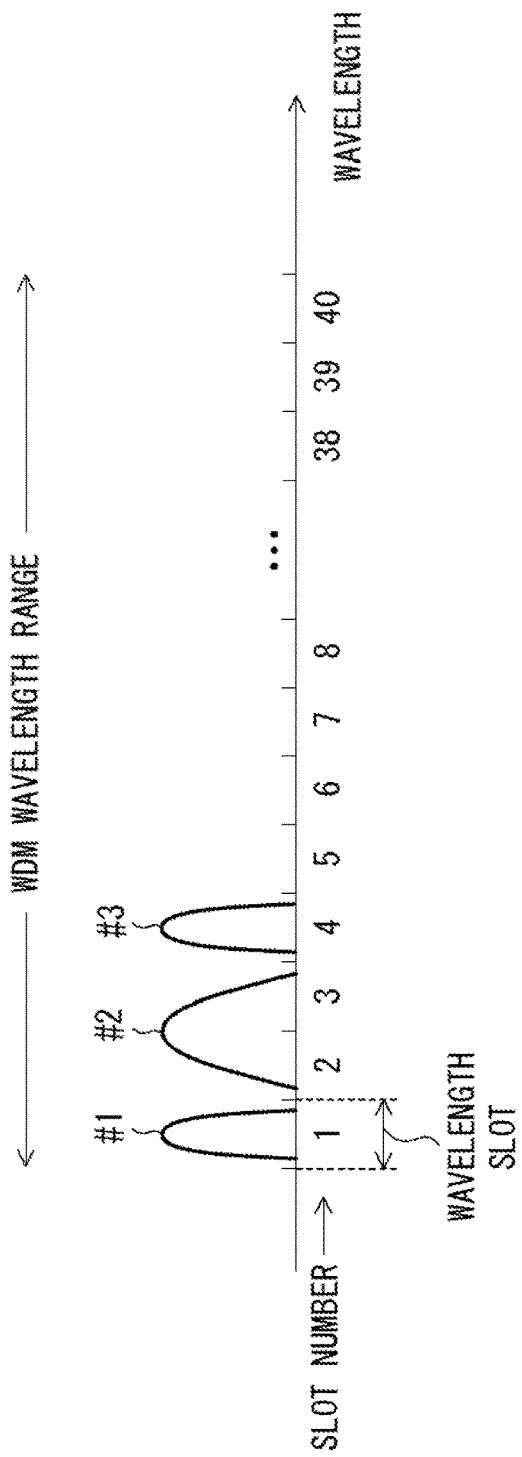
FIG. 3 illustrates examples of wavelength slots used in a WDM optical network.

An optical add-drop multiplexer (OADM) is installed, for example, in each node of a WDM optical network in which a WDM optical signal is transmitted. An optical add-drop multiplexer 500 includes a multiplexer/demultiplexer 501, an optical switch 502, and transponders 503, as illustrated in FIG. 2. The multiplexer/demultiplexer 501 demultiplexes a WDM optical signal received via an optical transmission line into optical signals of respective wavelengths, and guides the optical signals to the optical switch 502. In addition, the multiplexer/demultiplexer 501 multiplexes a plurality of optical signals that are output from the optical switch 502, and guides the multiplexed signal to the optical transmission line. The optical switch 502 controls a route of each of the optical signals. The transponders 503 are connected to respective clients.

In a case in which data is transmitted from client x1 to client x2, an optical line is established between a node that accommodates client x1 (hereinafter referred to as a start point node) and a node that accommodates client x2 (hereinafter referred to as an end point node). Here, it is assumed that a wavelength λx is allocated to this optical line. In this case, in the start point node of the optical line, the transponder 503 that is connected to client x1 generates an optical signal X that carries client data. The wavelength of the optical signal X is λx. The optical switch 502 adds the optical signal X to the WDM optical signal, and transmits the WDM optical signal to the next node. In respective nodes between the start point node and the endpoint node, the optical signal X is not dropped from the WDM optical signal, and is forwarded to the next node. In the end point node, the optical add-drop multiplexer 500 drops the optical signal X from the received WDM optical signal, and guides the optical signal X to client x2.

In this example, the optical signal X is transmitted from the start point node to the end point node without being converted into an electric signal. The carrier wavelength of the optical signal X does not change on a route from the start point node to the end point node. Namely, the same wavelength is allocated to optical lines that transmit the optical signal X on respective links between the start point node and the end point node.

FIG. 3 illustrates examples of wavelength slots used in a WDM optical network. Each of the wavelength slots corresponds to a minimum unit of wavelength resources allocated to an optical line. Accordingly, a WDM wavelength range is divided into a plurality of wavelength slots. In the example illustrated in FIG. 3, a WDM wavelength range is divided into 40 wavelength slots. In addition, the bandwidths of the respective wavelength slots are the same as each other. The bandwidth of each of the wavelength slots is defined, for example, by an optical frequency. As an example, the bandwidth of each of the wavelength slots is 12.5 GHz.

When an optical line is established in the WDM optical network, one or more wavelength slots are allocated to the optical line. The number of wavelength slots allocated to the optical line depends on a symbol rate and a modulation scheme of an optical signal transmitted via the optical line. In the example illustrated in FIG. 3, one wavelength slot (slot 1) is allocated to optical line #1, two wavelength slots (slots 2 and 3) are allocated to optical line #2, and one wavelength slot (slot 4) is allocated to optical line #3.

In this example, it is assumed that the priority of each of the wavelength slots is specified in advance. The priority represents the order of allocation to an optical line. In the example illustrated in FIG. 3, a wavelength slot having a small slot number has a high priority, and a wavelength slot having a large slot number has a low priority. Namely, in a case in which a plurality of wavelength slots can be allocated to a requested optical line, a wavelength slot having the smallest slot number among the plurality of wavelength slots is allocated to the requested optical line. Accordingly, in an initial state, wavelength slot 1 is allocated to the requested optical line. In addition, when a new optical line is established in the state illustrated in FIG. 3, wavelength slot 5 is allocated to the new optical line. When a bandwidth requested by this optical line corresponds to two wavelength slots, wavelength slots 5 and 6 are allocated to this optical line.

Figure 4:
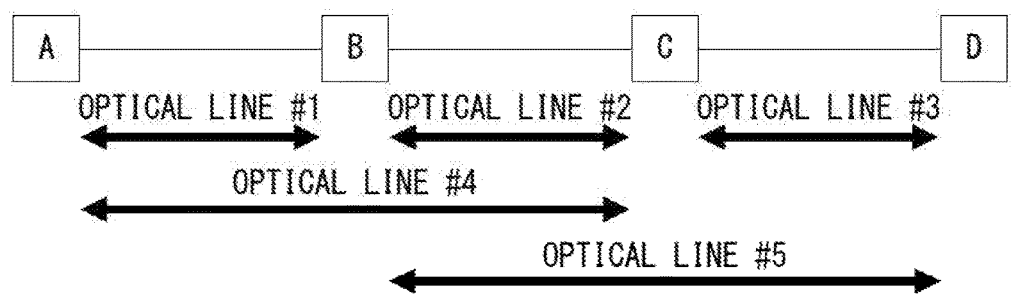
FIG. 4 illustrates examples of optical lines that are established in a WDM optical network.

FIG. 4 illustrates examples of optical lines that are established in a WDM optical network. In addition, FIGS. 5A-5D illustrate examples of wavelength allocation to the optical lines illustrated in FIG. 4. In the examples illustrated in FIG. 4 to FIG. 5D, the WDM optical network includes four nodes A-D. Node A and node B, node B and node C, and node C and node D are connected by respective optical fibers. It is assumed that optical lines #1 to #5 illustrated in FIG. 4 are sequentially established. In the description below, a link between node i and node j may be referred to as "link i-j". In addition, an optical fiber that connects node i and node j may be referred to as "fiber i-j". Stated another way, an optical fiber established on link i-j may be referred to as fiber i-j.

When a request to establish optical line #1 is made, no wavelength slots are being used on link A-B. In this case, a wavelength slot having the highest propriety among all of the wavelength slots (namely, wavelength slot S1) is allocated to optical line #1. Similarly, wavelength slot S1 is allocated to optical line #2 on link B-C, and wavelength slot S1 is allocated to optical line #3 on link C-D. Further, a request to establish optical line #4 between node A and node C is made. At this time, on link A-B and link B-C, wavelength slot S1 has already been used. Therefore, on each of link A-B and link B-C, wavelength slot S2 is allocated to optical line #4. FIG. 5A illustrates a state in which wavelength slots have been allocated to optical line #1 to optical line #4.

Then, optical line #2 is deleted. Namely, wavelength slot S1 that has been allocated to optical line #2 on link B-C is released. FIG. 5B illustrates a state in which wavelength slot S1 allocated to optical line #2 was released.

Further, optical line #5 is added. Here, wavelength slot S2 has already been used on link B-C, and wavelength slot S1 has already been used on link C-D. Namely, wavelength slots S1 and S2 are not available to establish optical line #5. Therefore, wavelength slot S3 is allocated to optical line #5 on each of link B-C and link C-D. FIG. 5C illustrates a state in which respective wavelength slots were allocated to optical line #1 and optical line #3 to optical line #5.

However, in the wavelength allocation illustrated in FIG. 5C, the usage efficiency of wavelength resources is low. Therefore, a wavelength allocation system installed in a network management system performs wavelength reallocation. Specifically, on link C-D, a wavelength slot allocated to optical line #3 is changed from wavelength slot S1 to wavelength slot S2. In addition, on link B-C and link C-D, a wavelength slot allocated to optical line #5 is changed from wavelength slot S3 to wavelength slot S1. Consequently, the allocation state illustrated in FIG. 5D is achieved. Namely, wavelength slot S3 is released. Consequently, the wavelength allocation system can allocate wavelength slot S3 to a new optical line.

FIGS. 6A and 6B illustrate other examples of optical lines that are established in a WDM optical network. Similarly to the example illustrated in FIG. 4, the WDM optical network illustrated in FIGS. 6A and 6B includes four nodes A to D. However, network topology is different between FIG. 4 and FIGS. 6A-6B.

Figure 7A:
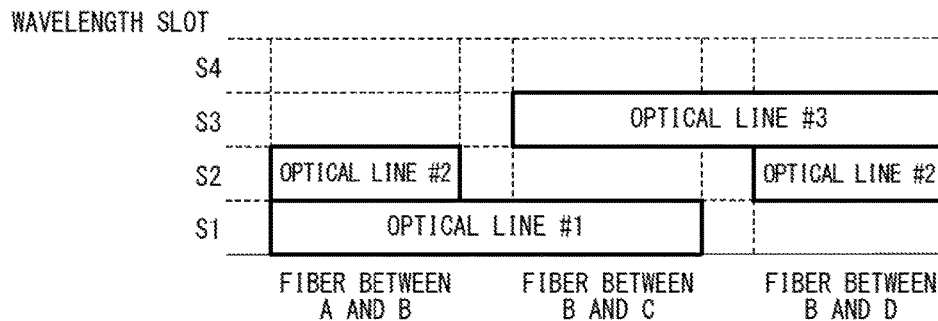
FIGS. 7A-7C illustrate examples of wavelength allocation to the optical lines illustrated in FIG. 6A or FIG. 6B.
Figure 7B:
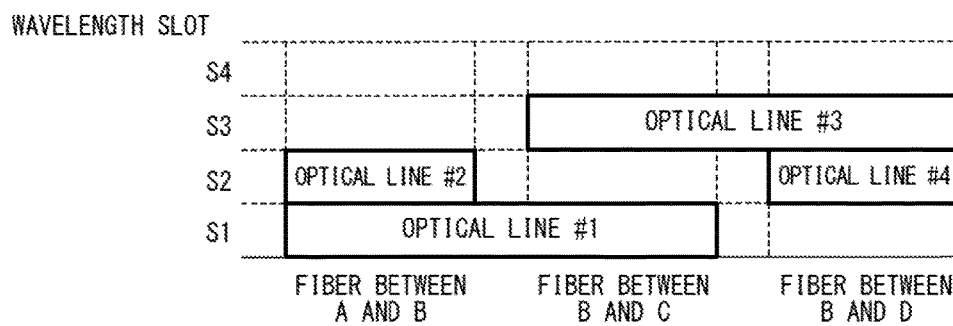

In the case illustrated in FIG. 6A, optical line #1 to optical line #3 are established. In this case, wavelength slots are allocated to optical line #1 to optical line #3, as illustrated in FIG. 7A. In addition, in the case illustrated in FIG. 6B, optical line #1 to optical line #4 are established. In this case, wavelength slots are allocated to optical line #1 to optical line #4, as illustrated in FIG. 7B.

Here, usage states of wavelength slots are the same in the two cases. Specifically, in both cases, wavelength slots S1 and S2 are used for link A-B, wavelength slots S1 and S3 are used for link B-C, and wavelength slots S2 and S3 are used for link B-D.

However, a constraint condition of wavelength allocation is different between the two cases. Specifically, in the case illustrated in FIG. 6A, optical line #2 is established between node A and node D. In this case, it is requested that a wavelength slot that is allocated to optical line #2 on link A-C be the same as a wavelength slot that is allocated to optical line #2 on link C-D. On the other hand, in the case illustrated in FIG. 6B, optical line #2 is established between node A and node C, and optical line #4 is established between node C and node D. In this case, a wavelength slot that is allocated to optical line #2 on link A-C may be different from a wavelength slot that is allocated to optical line #4 on link C-D.

Figure 7C:
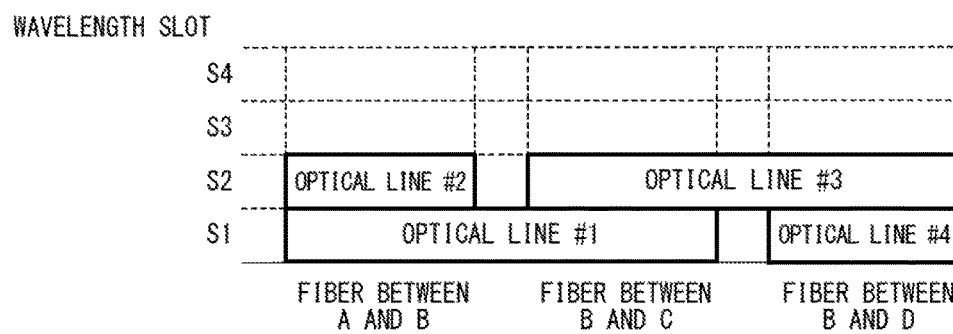

Accordingly, in the case illustrated in FIG. 6A, wavelength reallocation fails to be performed in such a way that wavelength usage efficiency is improved. On the other hand, in the case illustrated in FIG. 6B, wavelength reallocation can be performed in such away that the wavelength usage efficiency is improved. For example, on link B-D, a wavelength slot allocated to optical line #4 is changed from wavelength slot S2 to wavelength slot S1. In addition, on link B-C and link B-D, a wavelength slot allocated to optical line #3 is changed from wavelength slot S3 to wavelength slot S2. Consequently, the state illustrated in FIG. 7C is achieved. Namely, wavelength slot S3 is released.

As described above, the wavelength allocation system performs wavelength reallocation in such a way that the wavelength usage efficiency is improved. However, a network administrator may determine whether wavelength reallocation will be performed. Accordingly, a wavelength reallocation assist device according to the embodiments provides information indicating a usage state of wavelength resources in the WDM optical network such that the network administrator can perform wavelength reallocation at an appropriate timing.

<First Embodiment>

Figure 8:
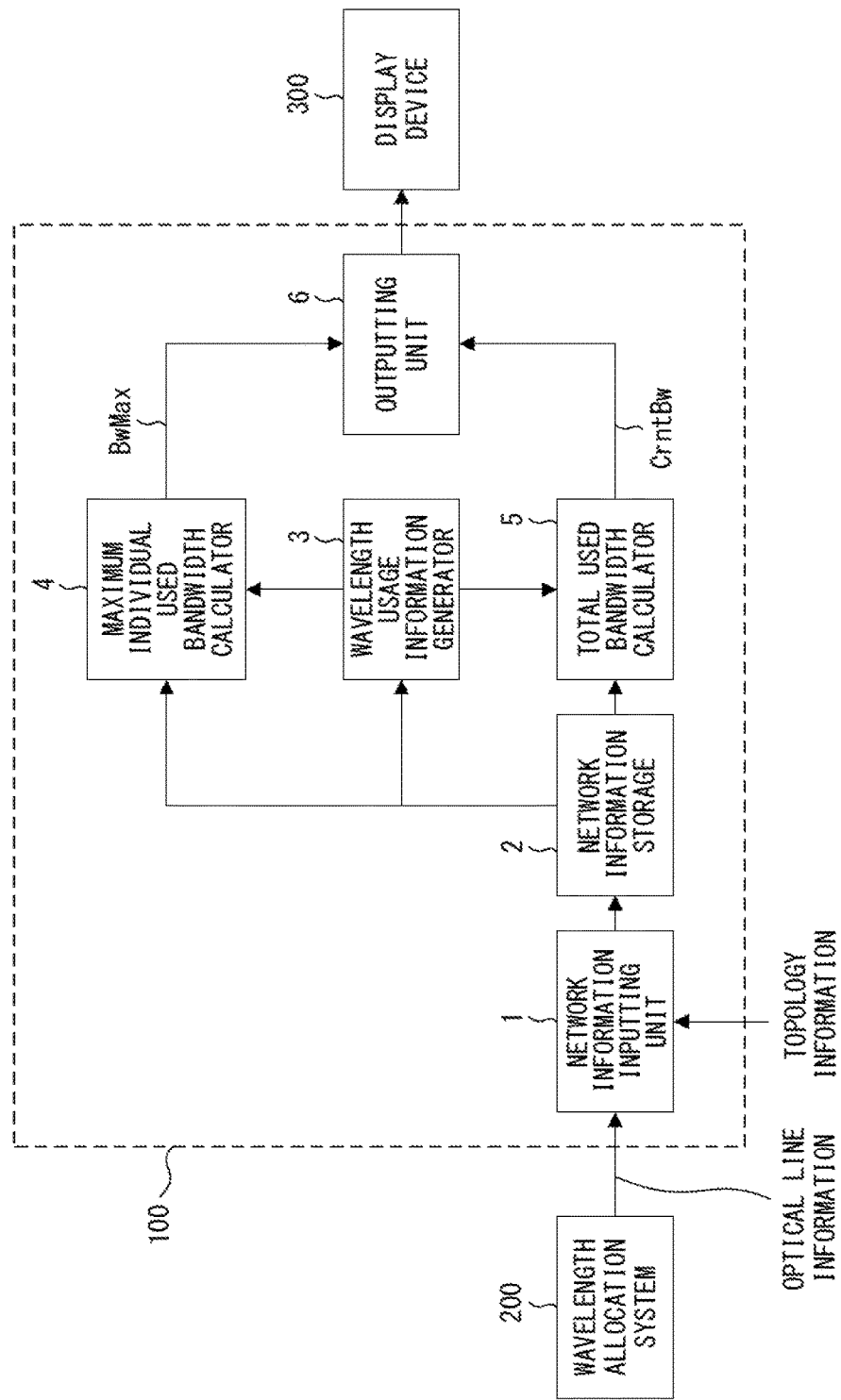
FIG. 8 illustrates an example of a wavelength reallocation assist device according to a first embodiment.

FIG. 8 illustrates an example of functions of a wavelength reallocation assist device according to a first embodiment. A wavelength reallocation assist device 100 according to the first embodiment includes a network information inputting unit 1, a network information storage 2, a wavelength usage information generator 3, a maximum individual used bandwidth calculator 4, a total used bandwidth calculator 5, and an outputting unit 6. The wavelength reallocation assist device 100 may include other functions that are not illustrated in FIG. 8.

The network information inputting unit 1 obtains network information. The network information includes topology information and optical line information that will be described later. In addition, the network information is generated, for example, by a network administrator, and is stored in a specified storage device. The network information inputting unit 1 stores the obtained network information in the network information storage 2.

The wavelength usage information generator 3 refers to the network information stored in the network information storage 2, and generates wavelength usage information indicating usage states of respective wavelength slots on respective links. When the usage states of the respective wavelength slots changes, the wavelength usage information generator 3 updates the wavelength usage information, and issues a calculation instruction to the maximum individual used bandwidth calculator 4 and the total used bandwidth calculator 5.

When the calculation instruction is given, the maximum individual used bandwidth calculator 4 refers to the network information stored in the network information storage 2, and calculates a maximum individual used bandwidth. In addition, the total used bandwidth calculator 5 refers to the network information stored in the network information storage 2 when the calculation instruction is given, and calculates a total used bandwidth. The outputting unit 6 outputs allocation state information indicating the maximum individual used bandwidth calculated by the maximum individual used bandwidth calculator 4 and the total used bandwidth calculated by the total used bandwidth calculator 5.

The outputting unit 6 displays, for example, the allocation state information indicating the maximum individual used bandwidth and the total used bandwidth on a display device 300. The outputting unit 6 may output the allocation state information indicating the maximum individual used bandwidth and the total used bandwidth in another manner. As an example, the outputting unit 6 may generate an electronic mail describing the allocation state information, and may transmit the electronic mail to a specified address.

FIG. 9 illustrates an example of the network topology of a WDM optical network, and an example of optical lines that are established in the WDM optical network. In the example illustrated in FIG. 9, the WDM optical network includes four nodes N1 to N4. Node N1 and node N2, node N2 and node N3, and node N3 and node N4 are connected by respective optical fibers. It is assumed that optical lines #1 to #6 illustrated in FIG. 9 are established in the WDM optical network.

FIGS. 10A and 10B illustrate an example of topology information. The topology information includes the node list illustrated in FIG. 10A and the link list illustrated in FIG. 10B in this example. The topology information illustrated in FIGS. 10A and 10B indicates the topology of the WDM optical network illustrated in FIG. 9.

Respective nodes in the WDM optical network are registered in the node list. In this example, nodes N1 to N4 illustrated in FIG. 9 are registered in the node list. In addition, respective links in the WDM optical network are registered in the link list. Each of the links corresponds to an optical fiber that connects nodes. In addition, each of the links is expressed by a start point node, an end point node, and the number of wavelengths. The number of wavelengths represents the number of available wavelength slots. When the number of available wavelength slots is the same on all of the links, the number of wavelengths does not need to be registered for individual links. In addition, when the number of wavelengths for communication from a start point node to an end point node is different from the number of wavelengths for communication from the end point node to the start point node, a link list may be generated for each transmission direction.

The topology information above is generated, for example, by a network administrator, and is given to the network information inputting unit 1. The network information inputting unit 1 stores the given topology information as a portion of the network information in the network information storage 2.

Figure 11:
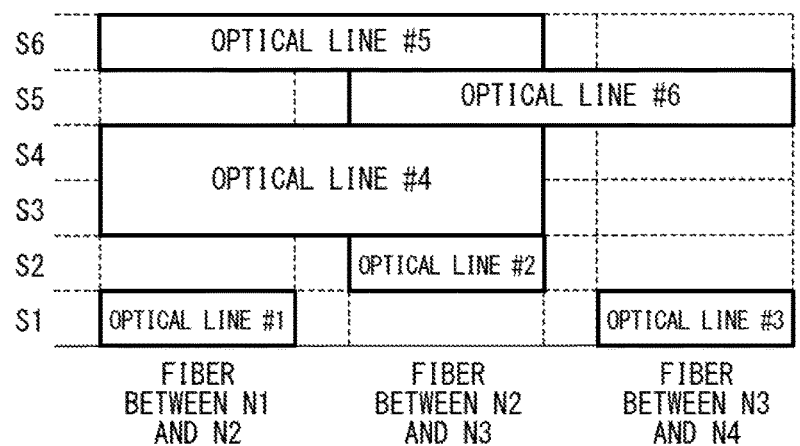
FIG. 11 illustrates an example of wavelength allocation to the optical lines illustrated in FIG. 9.

FIG. 11 illustrates an example of wavelength allocation to the optical lines illustrated in FIG. 9. In this example, each of optical lines #1 to #3, #5, and #6 uses a bandwidth that corresponds to one wavelength slot, and optical line #4 uses a bandwidth that corresponds to two wavelength slots. In addition, it is assumed that allocation of wavelength slots to the respective optical lines is performed by a wavelength allocation system 200 illustrated in FIG. 8.

Upon receipt of an optical line request that makes a request to establish an optical line from a user, the wavelength allocation system 200 allocates a wavelength slot to the optical line. In this case, the optical line request specifies a start point node, an end point node, a route, and a bandwidth. The wavelength allocation system 200 may release a corresponding wavelength slot when the wavelength allocation system 200 receives an optical line request that makes a request to delete an established optical line.

In this example, on link N1-N2, wavelength slot S1 is allocated to optical line #1. On link N2-N3, wavelength slot S2 is allocated to optical line #2. On link N3-N4, wavelength slot S1 is allocated to optical line #3. On link N1-N3 (namely, line N1-N2 and link N2-N3), wavelength slots S3 and S4 are allocated to optical line #4. On link N1-N3 (namely, link N1-N2 and link N2-N3), wavelength slot S6 is allocated to optical line #5. On link N2-N4 (namely, link N2-N3 and link N3-N4), wavelength slot S5 is allocated to optical line #6. The wavelength allocation system 200 generates optical line information indicating allocation of wavelength slots to the respective optical lines.

FIG. 12 illustrates an example of optical line information. The optical line information illustrated in FIG. 12 is generated when the wavelength allocation illustrated in FIG. 11 is performed on optical lines #1 to #6 illustrated in FIG. 9. A line ID identifies each optical line. A start point node, an endpoint node, a bandwidth, and a route are extracted from an optical line request that is made by a user. The bandwidth is expressed by the number of wavelength slots. A wavelength slot number represents a wavelength slot allocated to a corresponding optical line.

As an example, "bandwidth=1" and "wavelength slot number=1" are set for "line ID=1". This state represents that wavelength slot S1 has been allocated to optical line #1. In addition, "bandwidth=2" and "wavelength slot number=3" are set for "line ID=4". This state represents that wavelength slots S3 and S4 have been allocated to optical line #4.

The route is expressed by sequentially arranging nodes on a route from a start point node to an end point node. As an example, "route=N2, N3, N4" is set for "line ID=6". This state represents that a route of optical line #6 reaches node N4 from node N2 via node N3. The route may be expressed in another manner. As an example, the route may be expressed by one or more links that exist between a start point node and an end point node. Alternatively, the route may be expressed by nodes and links that exist between a start point node and an end point node.

The optical line information is updated when a new optical line is added, when the wavelength of an optical line is changed, or when an optical line is deleted. The wavelength allocation system 200 inputs the updated optical line information to the wavelength reallocation assist device 100. At this time, the wavelength allocation system 200 may input the entirety of the optical line information to the wavelength reallocation assist device 100, or may input only optical line information relating to an optical line that has been added, deleted, or changed in the wavelength reallocation assist device 100. Alternatively, the network information inputting unit 1 of the wavelength reallocation assist device 100 may periodically access the wavelength allocation system 200 and may obtain the optical line information. In the wavelength reallocation assist device 100, the optical line information is stored as a portion of the network information in the network information storage 2.

The wavelength reallocation assist device 100 provides information used to determine whether it is preferable that wavelength reallocation be performed in the WDM optical network, in accordance with the network information (the topology information and the optical line information). An operation of the wavelength reallocation assist device 100 is described below.

Figure 13:
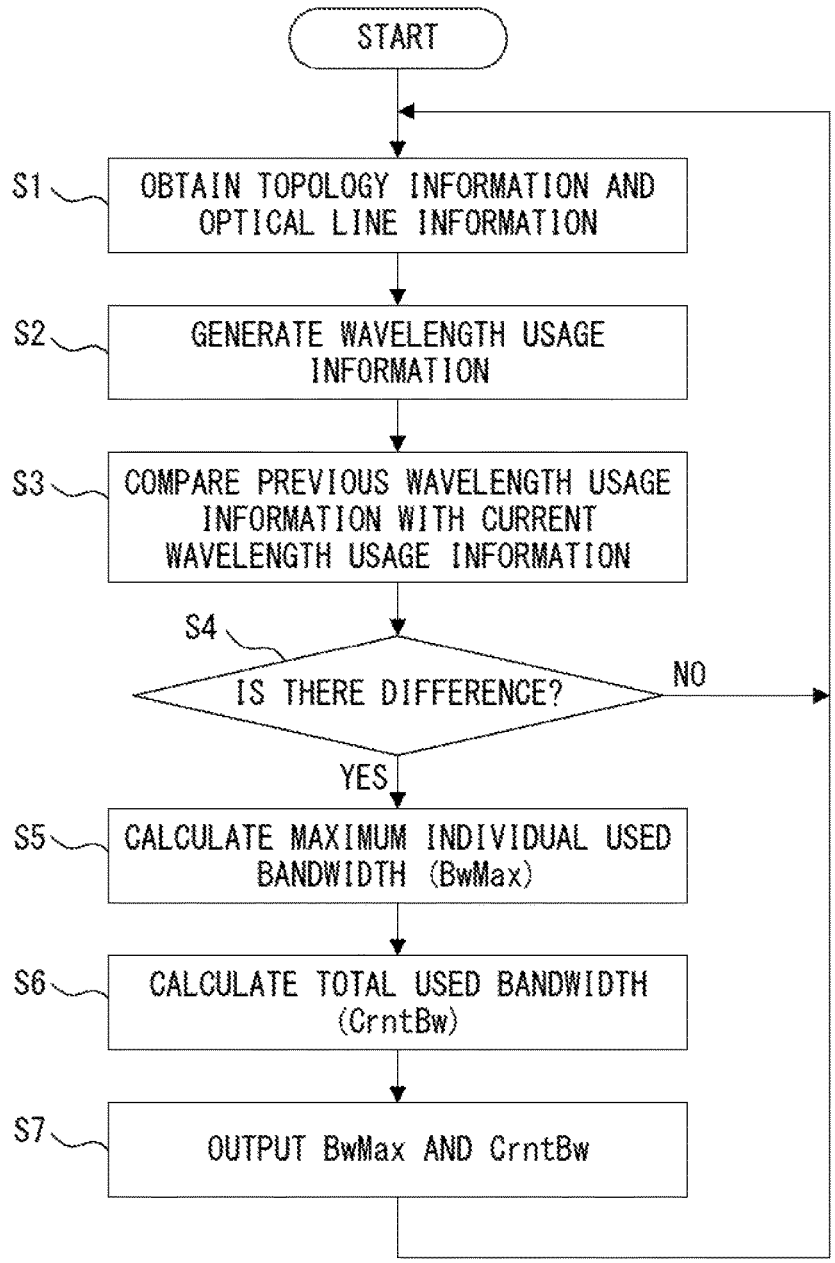
FIG. 13 is a flowchart illustrating an example of a wavelength reallocation assisting method according to the first embodiment.

FIG. 13 is a flowchart illustrating an example of a wavelength reallocation assisting method according to the first embodiment. The processing of this flowchart is performed, for example, when the network information is given to the wavelength reallocation assist device 100 or when the wavelength reallocation assist device 100 obtains the network information. In the description below, it is assumed that optical lines #1 to #6 are established in the WDM optical network, as illustrated in FIG. 9.

In S1, the network information inputting unit 1 obtains the network information. In this example, the network information inputting unit 1 obtains the topology information illustrated in FIGS. 10A and 10B and the optical line information illustrated in FIG. 12. Note that to "obtain the network information" includes that the network information is given to the wavelength reallocation assist device 100. The network information is stored in the network information storage 2.

In S2, the wavelength usage information generator 3 generates wavelength usage information. The wavelength usage information indicates a usage state of each wavelength slot on each link (namely, each fiber). Accordingly, when optical lines #1 to #6 are established in the WDM optical network illustrated in FIG. 9, the wavelength usage information illustrated in FIG. 14 is generated.

In the example illustrated in FIG. 14, "true" represents a state in which a wavelength slot has been allocated to an optical line, and "false" represents a state in which a wavelength slot has not been allocated to an optical line. As an example, wavelength slot S1 in fiber N1-N2 (an optical fiber between node N1 and node N2) has been allocated to optical line #1, and therefore "true" is set. In addition, wavelength slot S1 in fiber N2-N3 (an optical fiber between node N2 and node N3) has not been allocated to any optical lines, and therefore "false" is set. A line ID of an established optical line may be written instead of true/false.

The generated wavelength usage information is stored, for example, within the wavelength usage information generator 3. Here, the wavelength usage information generator 3 stores the latest wavelength usage information. Namely, the wavelength usage information generator 3 manages current usage states of respective wavelength slots on respective links.

In S3 and S4, the wavelength usage information generator 3 compares the previously generated wavelength usage information with the newly generated wavelength usage information. When the wavelength usage information changes, the processing of the wavelength reallocation assist device 100 proceeds to S5. When the wavelength usage information does not change, the processing of the wavelength reallocation assist device 100 returns to S1. As an example, when a new optical line is established, a state of a corresponding wavelength slot on a link on which the optical line is established changes from false to true. When an established optical line is deleted, a state of a corresponding wavelength slot on a link on which the optical line is established changes from true to false. In a case in which the topology information is given to the wavelength reallocation assist device 100 only when the network topology changes, or in a case in which the optical line information is given to the wavelength reallocation assist device 100 only when an optical line is added, deleted, or changed, the processes of S3 and S4 may be omitted.

In S5, the maximum individual used bandwidth calculator 4 refers to the network information stored in the network information storage 2, and calculates a maximum individual used bandwidth (BwMax). The maximum individual used bandwidth represents a maximum value of one or more individual used bandwidths that are calculated according to the network information. The individual used bandwidth represents the sum of the bandwidths of optical lines that belong to a set of optical lines to which the same wavelength fails to be allocated. Here, in a case in which a plurality of optical lines are established on one fiber, the same wavelength fails to be allocated to the plurality of optical lines. As an example, optical lines #1, #4, and #5 are established on link N1-N2 (a fiber between node N1 and node N2). In this case, optical lines #1, #4, and #5 belong to a set of optical lines to which the same wavelength fails to be allocated.

Accordingly, in this example, the maximum individual used bandwidth calculator 4 first calculates, for each of the optical fibers, an individual used bandwidth that represents the sum of the bandwidths of wavelength slots that are allocated to respective optical lines that are established in each of the optical fibers. Then, the maximum individual used bandwidth calculator 4 calculates a maximum individual used bandwidth that represents a maximum value of the individual used bandwidths calculated for the respective optical fibers.

FIG. 15 is a flowchart illustrating an example of a method for calculating a maximum individual used bandwidth. The processing of this flowchart is performed, for example, when the wavelength usage information changes. In addition, in this example, a set including optical lines that are established in a corresponding fiber as elements is obtained for each of the fibers, and the sum of the bandwidths of the optical lines included in the set is calculated. In the flowchart illustrated in FIG. 15, the variable Bcmt is used to calculate the sum of the bandwidths of selected optical lines. In addition, the variable BwMax represents a maximum value of the variables Bcmt.

In S11, the maximum individual used bandwidth calculator 4 selects one optical fiber from all of the fibers that are implemented in the WDM optical network. In S12, the maximum individual used bandwidth calculator 4 selects one optical line from all of the optical lines that are established in the WDM optical network. In S13, the maximum individual used bandwidth calculator 4 determines whether the optical line selected in S12 is established in the fiber selected in S11. When the optical line selected in S12 is established in the fiber selected in S11, the maximum individual used bandwidth calculator 4 adds the bandwidth of the optical line selected in S12 to the variable Bcmt. When the optical line selected in S12 is not established in the fiber selected in S11, the process of S14 is skipped.

In S15, the maximum individual used bandwidth calculator 4 determines whether all of the optical lines have been selected. When there is an optical line that has not been selected, the processing of the maximum individual used bandwidth calculator 4 returns to S12. Namely, the processes of S13 and S14 are performed on all of the optical lines. Consequently, the sum of the bandwidths of optical lines that are established in the fiber selected in S11 is calculated. Stated another way, the individual used bandwidth is calculated for the fiber selected in S11.

In S16, the maximum individual used bandwidth calculator 4 compares the variable Bcmt and the variable BwMax that are calculated in S11 to S15. When the variable Bcmt is greater than the variable BwMax, the maximum individual used bandwidth calculator 4 stores a value of the variable Bcmt as the variable BwMax in S17. When the variable Bcmt is smaller than or equal to the variable BwMax, the process of S17 is skipped.

In S18, the maximum individual used bandwidth calculator 4 determines whether all of the fibers have been selected. When there is a fiber that has not been selected, the processing of the maximum individual used bandwidth calculator 4 returns to S11. Namely, the processes of S12 to S17 are performed on all of the fibers. Consequently, a maximum value of the individual used bandwidths calculated for the respective fibers (namely, the maximum individual used bandwidth) is obtained.

In the WDM optical network illustrated in FIG. 9, the maximum individual used bandwidth is calculated as below. First, fiber N1-N2 is selected according to the topology information illustrated in FIG. 10B. Then, an individual used bandwidth of fiber N1-N2 is calculated.

Namely, optical lines are sequentially selected from optical lines #1 to #6 in accordance with the optical line information illustrated in FIG. 12. When optical line #1 is selected, the maximum individual used bandwidth calculator 4 determines whether optical line #1 is established in fiber N1-N2 in accordance with the optical line information. In this case, when N1 and N2 are consecutive in a "route" that corresponds to optical line #1, it is determined that optical line #1 is established in fiber N1-N2. In this example, optical line #1 is established in fiber N1-N2, and therefore the bandwidth of optical line #1 is added to the variable Bcmt. Here, an initial value of the variable Bcmt is zero, and the bandwidth of optical line #1 is "1". Accordingly, when optical line #1 is selected, variable Bcmt=1 is obtained.

Then, optical line #2 is selected. However, optical line #2 is not established in fiber N1-N2. Therefore, the variable Bcmt is not updated. Similarly, optical line #3 is not established in fiber N1-N2, and therefore the variable Bcmt is not updated.

Optical line #4 is established in fiber N1-N2. Here, the bandwidth of optical line #4 is "2". Accordingly, the variable Bcmt is updated from "1" to "3". Further, optical line #5 is established in fiber N1-N2, and optical line #6 is not established in fiber N1-N2. Accordingly, the variable Bcmt is updated from "3" to "4". As described above, the individual used bandwidth of fiber N1-N2 is "4".

Similarly, individual used bandwidths are respectively calculated for fiber N2-N3 and fiber N3-N4. In this example, the individual used bandwidth of fiber N2-N3 is "5", and the individual used bandwidth of fiber N3-N4 is "2". Accordingly, the maximum individual used bandwidth is "5".

Return now to FIG. 13. In S6, the total used bandwidth calculator 5 refers to the network information stored in the network information storage 2, and calculates a total used bandwidth (CrntBw).

Figure 16:
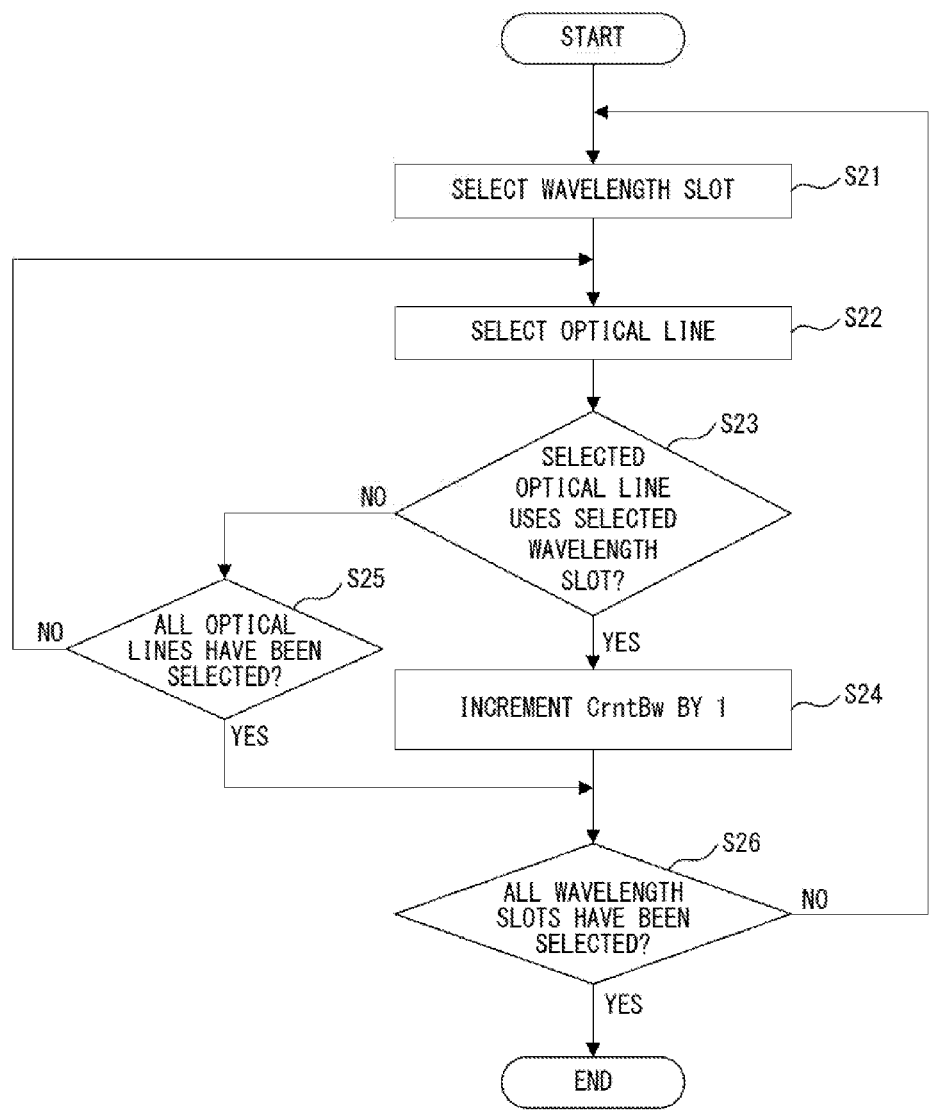
FIG. 16 is a flowchart illustrating an example of a method for calculating a total used bandwidth.

FIG. 16 is a flowchart illustrating an example of a method for calculating a total used bandwidth. The processing of this flowchart is performed, for example, when the wavelength usage information changes. In the flowchart illustrated in FIG. 16, the variable CrntBw is used to count the number of wavelength slots that are being used by any optical line.

In S21, the total used bandwidth calculator 5 selects one wavelength slot from available wavelength slots in the WDM optical network. In S22, the total used bandwidth calculator 5 selects one optical line from all of the optical lines that are ESTABLISHED in the WDM optical network. In S23, the total used bandwidth calculator 5 determines whether the optical line selected in S22 uses the wavelength slot selected in S21.

When the optical line selected in S22 uses the wavelength slot selected in S21, the total used bandwidth calculator 5 increments the variable CrntBw by 1 in S24. When the optical line selected in S22 does not use the wavelength slot selected in S21, the total used bandwidth calculator 5 determines whether all of the optical lines have been selected in S25. When there is an optical line on which the determination of S23 has not been performed, the processing of the total used bandwidth calculator 5 returns to S22.

When the variable CrntBw is incremented or when the determination of S23 has been performed on all of the optical lines, the processing of the total used bandwidth calculator 5 proceeds to S26. In S26, the total used bandwidth calculator 5 determines whether the processes of S22 to S25 have been performed on all of the wavelength slots. When there is a wavelength slot on which the processes of S22 to S25 have not been performed, the processing of the total used bandwidth calculator 5 returns to S21.

As described above, the total used bandwidth calculator 5 determines whether each of the wavelength slots is being used by any optical line. Then, the number of wavelength slots being used by corresponding optical lines is counted. Here, the bandwidths of the respective wavelength slots are known. Therefore, the sum of the bandwidths of the wavelength slots being used by corresponding optical lines (namely, the total used bandwidth) is calculated.

In the WDM optical network illustrated in FIG. 9, the total used bandwidth is calculated as below. First, wavelength slot S1 is selected, and optical line #1 is selected. According to the optical line information illustrated in FIG. 12, wavelength slot S1 has been allocated to optical line #1. Namely, wavelength slot S1 is being used by optical line #1. Accordingly, in S24, the variable CrntBw is incremented by 1. Here, an initial value of the variable CrntBw is zero. Accordingly, the variable CrntBw is updated from "0" to "1". Note that the total used bandwidth calculator 5 counts the number of wavelength slots that are being used by any optical line. Therefore, when it is detected that wavelength slot S1 is being used by optical line #1, the determination of S23 does not need to be performed on another optical line. Namely, the next wavelength slot is selected.

Wavelength slot S2 is selected, and optical line #1 is selected. However, wavelength slot S1 has been allocated to optical line #1, and the bandwidth of optical line #1 is "1". Accordingly, wavelength slot S2 is not being used by optical line #1. Then, optical line #2 is selected for wavelength slot S2. Here, wavelength slot S2 has been allocated to optical line #2. Namely, wavelength S2 is being used by optical line #2. Accordingly, in S24, the variable CrntBw is incremented by 1. Consequently, the variable CrntBw is updated from "1" to "2".

Wavelength slot S3 is being used by optical line #4, as illustrated in FIG. 12. Accordingly, the variable CrntBw is updated from "2" to "3". In addition, the bandwidth of optical line #4 is "2". Therefore, wavelength slot S3 and the next wavelength slot have been allocated to optical line #4. Namely, wavelength slot S4 is also being used by optical line #4. Consequently, the variable CrntBw is updated from "3" to "4".

Wavelength slot S5 is being used by optical line #6, and therefore the variable CrntBw is updated from "4" to "5".

Further, wavelength slot S6 is being used by optical line #5, and therefore the variable CrntBw is updated from "5" to "6".

Similarly, the processing of the flowchart illustrated in FIG. 16 is performed on all of the wavelength slots. In the example illustrated in FIG. 3, it is determined whether each of wavelength slots S1 to S40 is being used by any of the optical lines. Consequently, the total used bandwidth is calculated. In the WDM optical network illustrated in FIG. 9, total used bandwidth=6 is obtained when optical lines #1 to #6 are established.

In S7, the outputting unit 6 outputs allocation state information that indicates the maximum individual used bandwidth (BwMax) calculated in S5 and the total used bandwidth (CrntBw) calculated in S6. Here, the total used bandwidth corresponds to the number of wavelength slots that are being used by any of the optical lines. Accordingly, the total used bandwidth is equivalent to the number of wavelengths that are currently being used. Meanwhile, the maximum individual used bandwidth is a maximum value of the sum of the bandwidths of one or more optical lines to which the same wavelength fails to be allocated. Namely, it is considered that the total used bandwidth can be reduced to almost the maximum individual used bandwidth by optimizing wavelength allocation to respective optical lines. In other words, the maximum individual used bandwidth represents a minimum bandwidth needed to accommodate all established optical lines. Therefore, the maximum individual used bandwidth corresponds to the expected number of used wavelengths after defrag (namely, wavelength reallocation) is performed.

A difference between the maximum individual used bandwidth and the total used bandwidth corresponds to the number of wavelength slots that is expected to be able to be reduced by defrag. Namely, this difference represents the magnitude of an effect of defrag.

Figure 17:
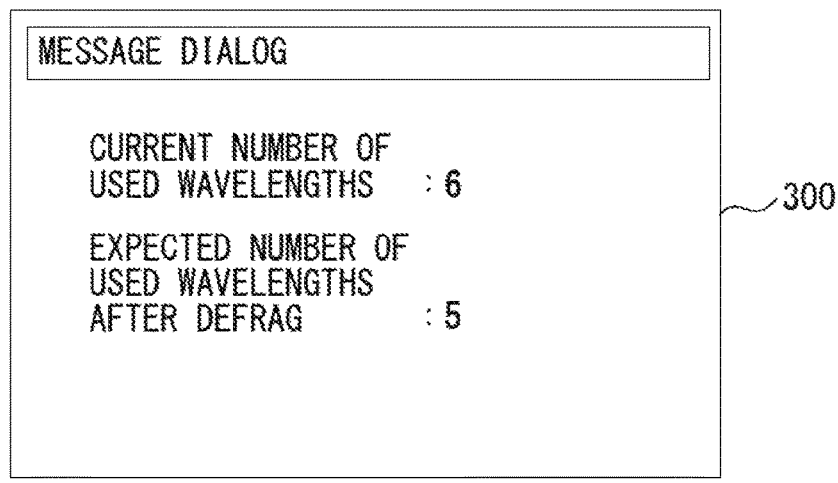
FIG. 17 illustrates a display example of a calculation result according to the first embodiment.

The allocation state information indicating the total used bandwidth (the current number of used wavelengths) and the maximum individual used bandwidth (the expected number of used wavelengths after defrag) is displayed on the display device 300, as illustrated in FIG. 17, for example. A message dialog is displayed, for example, when the total used bandwidth and/or the maximum individual used bandwidth are calculated. Alternatively, the total used bandwidth and/or the maximum individual used bandwidth may be always displayed. In this case, when a calculation result changes, the message dialog is updated. In addition, when calculation results of the total used bandwidth and/or the maximum individual used bandwidth change, the outputting unit 6 may transmit an electronic mail including the calculation results to a specified address.

A network administrator can determine whether it is preferable that defrag will be performed, in accordance with the total used bandwidth and the maximum individual used bandwidth. As an example, when a difference between the maximum individual used bandwidth and the total used bandwidth is large, it is considered that the number of used wavelengths can be greatly reduced by performing defrag. In this case, it is preferable that the network administrator perform wavelength reallocation. When the difference between the maximum individual used bandwidth and the total used bandwidth is small, it is considered that the number of used wavelengths will not be reduced so much even if defrag is performed. In this case, it may be better not to perform wavelength reallocation. As described above, the wavelength reallocation assist device 100 reports a timing at which it is preferable that defrag be performed to the network administrator. Namely, the network administrator can easily recognize a timing at which it is preferable that defrag be performed. Accordingly, communication resources can be used effectively without performing wavelength reallocation at a higher frequency than needed.

In the display form illustrated in FIG. 17, the total used bandwidth and the maximum individual used bandwidth are displayed in the same format regardless of the order of allocation of wavelength slots to optical lines. In addition, the wavelength reallocation assist device 100 may display, on the display device 300, additional information indicating the number of optical lines to which wavelengths have failed to be allocated during a specified time period in the past, in addition to the total used bandwidth and the maximum individual used bandwidth.

The order of performing the processes of respective steps is not limited to the example illustrated in FIG. 13. As an example, the wavelength reallocation assist device 100 may perform the process of S6 before the process of S5.

As described above, according to the embodiments, a predictive value of the minimum number of wavelengths needed to accommodate optical lines (in this example, the number of wavelength slots) is calculated. The predictive value is displayed together with the number of wavelengths in use. Accordingly, a network administrator can easily recognize a timing at which it is preferable that wavelength reallocation be performed. In addition, if the display above is performed when an optical line is added, deleted, or changed, a small burden is imposed on the network administrator.

<Second Embodiment>

Figure 18:
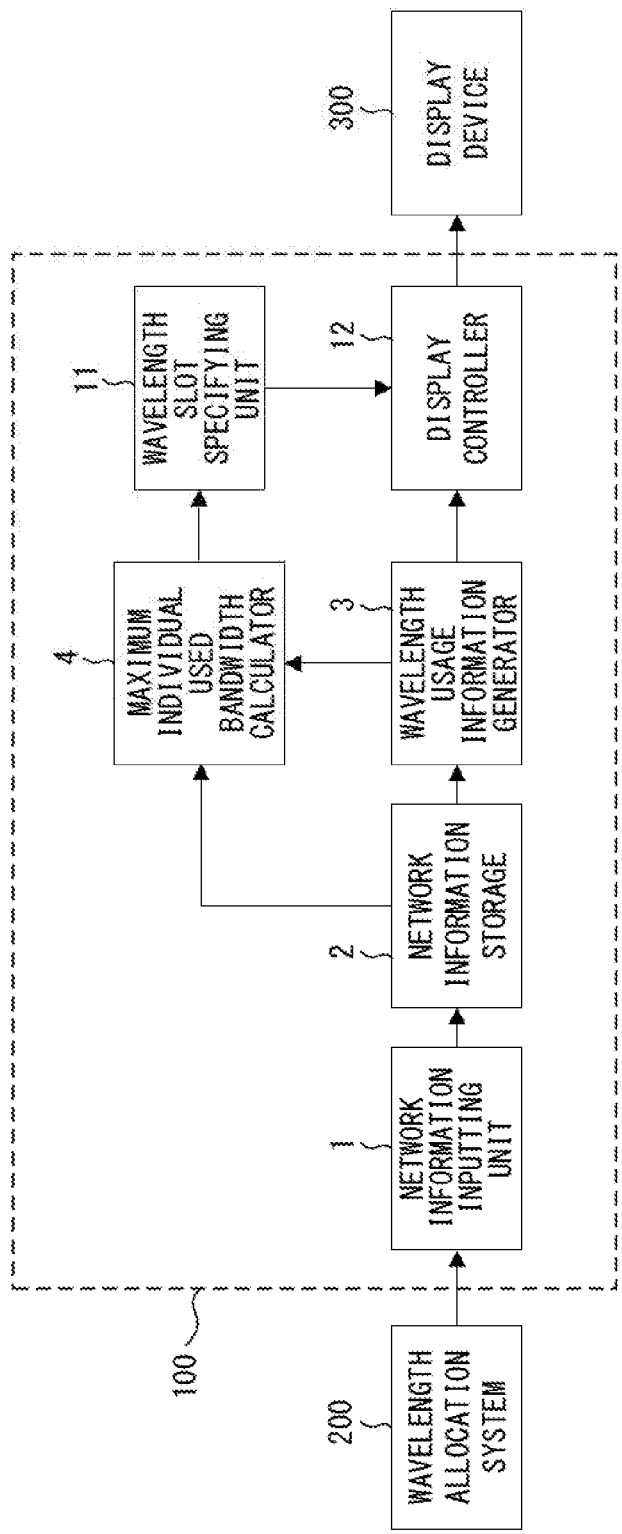
FIG. 18 illustrates an example of a wavelength reallocation assist device according to a second embodiment.

FIG. 18 illustrates an example of functions of a wavelength reallocation assist device according to a second embodiment. A wavelength reallocation assist device 100 according to the second embodiment includes a network information inputting unit 1, a network information storage 2, a wavelength usage information generator 3, a maximum individual used bandwidth calculator 4, a wavelength slot specifying unit 11, and a display controller 12. Note that the network information inputting unit 1, the network information storage 2, the wavelength usage information generator 3, and the maximum individual used bandwidth calculator 4 are substantially the same in the first embodiment and the second embodiment.

The wavelength slot specifying unit 11 specifies a wavelength slot that corresponds to the maximum individual used bandwidth calculated by the maximum individual used bandwidth calculator 4. As an example, the wavelength slot specifying unit 11 specifies a slot number X of an interested wavelength slot that corresponds to the maximum individual used bandwidth according to the formula below.

$X$=minimum slot number−1+maximum individual used bandwidth

In this example, wavelength slots S1 to S40 are prepared. When the wavelength slots are allocated to optical lines, a wavelength slot having a smaller slot number is sequentially selected. Namely, the minimum slot number is "1". In addition, in the example illustrated in FIG. 11, maximum individual used bandwidth BwMax=5 is obtained. In this case, a slot number X of an interested wavelength slot is "5 (=1−1+5)".

The display controller 12 generates a usage information graph indicating the wavelength usage information generated by the wavelength usage information generator 3, and displays the usage information graph on the display device 300. In addition, the display controller 12 identifies the interested wavelength slot that is specified by the wavelength slot specifying unit 11 on the usage information graph. The interested wavelength slot is identified by text, a figure, or a symbol.

Figure 19:
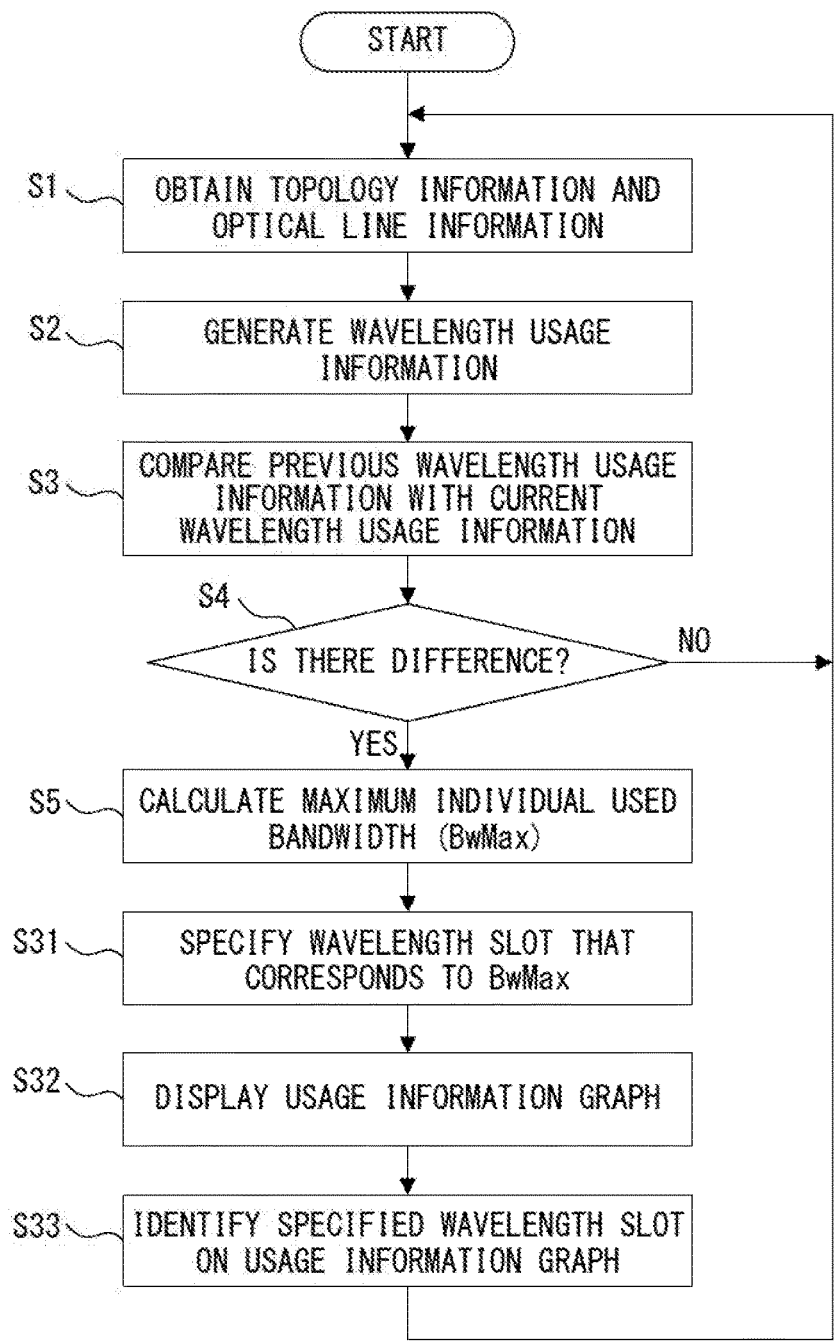
FIG. 19 is a flowchart illustrating an example of a wavelength reallocation assisting method according to the second embodiment.

FIG. 19 is a flowchart illustrating an example of a wavelength reallocation assisting method according to the second embodiment. The processes of S1 to S5 are substantially the same in the first embodiment and the second embodiment. Namely, in S1 to S5, the maximum individual used bandwidth is calculated.

In S31, the wavelength slot specifying unit 11 specifies an interested wavelength slot that corresponds to the maximum individual used bandwidth calculated by the maximum individual used bandwidth calculator 4. In S32, the display controller 12 generates the usage information graph indicating wavelength usage information, and displays the usage information graph on the display device 300. In S33, the display controller 12 identifies the interested wavelength slot on the usage information graph.

FIGS. 20A and 20B illustrate display examples of the wavelength usage information according to the second embodiment. In the second embodiment, the wavelength usage information is expressed by the usage information graph. The horizontal axis of the graph represents respective links of the WDM optical network (namely, respective optical fibers that configure the WDM optical network). The vertical axis of the graph represents wavelength slots that are available in the WDM optical network. The wavelength slots are arranged in order from a wavelength slot with a higher priority that is allocated to an optical line. In the examples illustrated in FIGS. 20A and 20B, wavelength slots S2, S3, S4, . . . are arranged in order from wavelength slot S1 with the highest priority. A state in which respective optical lines #1 to #6 use the respective wavelength slots is indicated by this usage information graph. Note that the maximum individual used bandwidth BwMax is 5 in this example.

In the example illustrated in FIG. 20A, a border line 21 is displayed on the usage information graph in such a way that wavelength slot S5 that corresponds to the maximum individual used bandwidth is identified. The border line 21 is drawn between wavelength slot S5 and wavelength slot S6. In this case, it is estimated that optical line #6 that is arranged above the border line 21 can be reallocated in wavelength slots S1 to S5 by performing defrag. Stated another way, a network administrator can easily recognize an effect of defrag based on a position of the border line 21. Specifically, the network administrator can determine whether it is preferable that defrag be performed, in accordance with the number of optical lines that are arranged above the border line 21.

Note that a method for identifying the interested wavelength slot is not limited to the example illustrated in FIG. 20A. As an example, wavelength slot S5 that corresponds to the maximum individual used bandwidth may be identified by an arrow 22, as illustrated in FIG. 20B.

<Third Embodiment>

FIG. 21 illustrates an example of functions of a wavelength reallocation assist device according to a third embodiment. A wavelength reallocation assist device 100 according to the third embodiment includes a network information inputting unit 1, a network information storage 2, a wavelength usage information generator 3, a maximum individual used bandwidth calculator 4, a total used bandwidth calculator 5, the outputting unit 6, and a determination unit 13.

The determination unit 13 determines whether a difference between the total used bandwidth CrntBw and the maximum individual used bandwidth BwMax is greater than a specified threshold. This difference represents an estimated value of a bandwidth released by defrag (namely, the number of wavelength slots released by defrag). Here, when the difference is large, it is considered that an effect of defrag is large. A determination result of the determination unit 13 is given to the outputting unit 6. The outputting unit 6 outputs the determination result of the determination unit 13 in addition to the allocation state information indicating the total used bandwidth and the maximum individual used bandwidth. As an example, when the difference is greater than the threshold, the outputting unit 6 displays a message recommending that defrag be performed on the display device 300. Note that the threshold is specified, for example, by a network administrator.

FIG. 22 is a flowchart illustrating an example of a wavelength reallocation assisting method according to the third embodiment. Note that the processes of S1 to S7 are substantially the same in the first embodiment and the third embodiment. Namely, in S1 to S7, the total used bandwidth CrntBw and the maximum individual used bandwidth BwMax are calculated.

In S41, the determination unit 13 compares a difference between the total used bandwidth CrntBw and the maximum individual used bandwidth BwMax with a specified threshold TH. When the difference is greater than the threshold TH, the outputting unit 6 outputs a message recommending that defrag be performed in S42.

The message recommending that defrag be performed is output, for example, using the following methods.
(1) Display the message by using a dedicated dialog box.
(2) Display the message by using a balloon in a window.
(3) Transmit an email to a specified address.
(4) Display the message together with the total used bandwidth and the maximum individual used bandwidth.
(5) Highlight a portion of the usage information graph illustrated in FIG. 20A or FIG. 20B (change a color or font).

<Fourth Embodiment>

In the third embodiment, when a difference between the total used bandwidth and the maximum individual used bandwidth is greater than a threshold, a message recommending that defrag be performed is output. On the other hand, in the fourth embodiment, when the difference between the total used bandwidth and the maximum individual used bandwidth is greater than the threshold, defrag processing is started automatically. In this case, when the difference is greater than the threshold, an instruction to start defrag processing is issued from the determination unit 13 to the wavelength allocation system 200.

Figure 23:
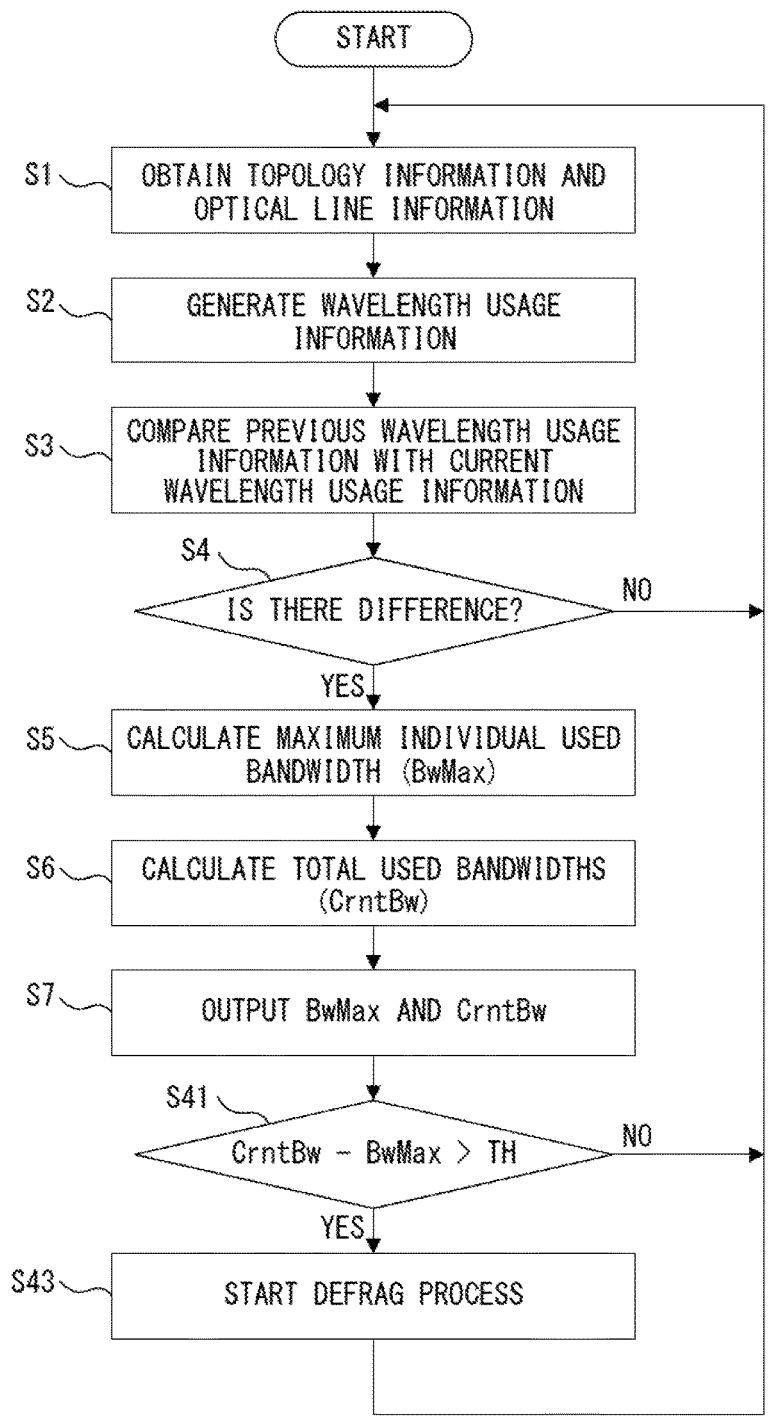
FIG. 23 is a flowchart illustrating an example of a wavelength reallocation assisting method according to a fourth embodiment.

FIG. 23 is a flowchart illustrating an example of a wavelength reallocation assisting method according to the fourth embodiment. In the fourth embodiment, when the difference between the total used bandwidth and the maximum individual used bandwidth is greater than the threshold, the determination unit 13 issues an instruction to start defrag processing to the wavelength allocation system 200 in S43.

<Fifth Embodiment>

In a fifth embodiment, the maximum individual used bandwidth is calculated by using mathematical programming instead of the processing of the flowchart illustrated in FIG. 15. In this example, the maximum individual used bandwidth is calculated by using the model below.

$$\max \Sigma w_i x_i \quad (1)$$

$$x_i + x_j \leq 1 \quad (2)$$

Formula (1) expresses an objective function. $w_i$ represents the bandwidth of optical line #i. In this example, the bandwidth of an optical line is expressed by the number of wavelength slots. $x_i$ is an integer variable, and is 0 or 1. "$x_i=1$" represents that optical line #i belongs to a maximum bandwidth set. The maximum bandwidth set refers to a set for which the sum of the bandwidths of optical lines included in the set is the largest from among sets of optical lines to which the same wavelength fails to be allocated. "$x_i=0$" represents that optical line #i does not belong the maximum bandwidth set. Accordingly, Formula (1) maximizes the sum of the bandwidths of optical lines that belong to a set of optical lines to which the same wavelength fails to be allocated.

In Formula (2), i and j represent a combination of two arbitrary optical lines #i and #j to which the same wavelength can be allocated. Formula (2) is generated for all of the combinations of i and j. When there are no links on which optical lines #i and #j are established, the same wavelength can be allocated to optical lines #i and #j.

As an example, in the WDM optical network illustrated in FIG. 9, six variables $x_1$, $x_2$, $x_3$, $x_4$, $x_5$, and $x_6$ are generated for six optical lines #1 to #6. In addition, the bandwidth of optical line #4 is 2, and each of the bandwidths of the other optical lines #1 to #3, #5 and #6 is 1. Namely, Formula (1) is expressed as below.

$$\Sigma w_i x_i = x_1 + x_2 + x_3 + 2x_4 + x_5 + x_6$$

The constraint condition of Formula (2) is expressed, for example, by the constraint condition table illustrated in FIG. 24. In the constraint condition table illustrated in FIG. 24, each row corresponds to optical line #i, and each column corresponds to optical line #j. As an example, in a field expressed by row #1 and column #2, "1" is written when there is a link on which optical lines #1 and #2 are established duplicately, and "0" is written when there are no links on which optical lines #1 and #2 are established duplicately. In a field that corresponds to i=j, "-" is written.

As an example, a constraint condition for the WDM optical network illustrated in FIG. 9 is described. First, optical lines #1, #4, and #5 are established on link N1-N2. Namely, wavelength slots different from each other are allocated to optical lines #1, #4, and #5. Accordingly, in row #1, "1" is written in fields that respectively correspond to columns #4 and #5. In row #4, "1" is written in fields that respectively correspond to columns #1 and #5. In row #5, "1" is written in fields that respectively correspond to columns #1 and #4. Similarly, optical lines #2, #4, #5, and #6 are established on link N2-N3. Accordingly, in row #2, "1" is written in fields that respectively correspond to columns #4, #5, and #6. In row #4, "1" is written in fields that respectively correspond to columns #2, #5, and #6. In row #5, "1" is written in fields that respectively correspond to columns #2, #4, and #6. In row #6, "1" is written in fields that respectively correspond to columns #2, #4, and #5. Further, optical lines #3 and #6 are established on link N3-N4. Accordingly, in row #3, "1" is written in a field that corresponds to column #6. In row #6, "1" is written in a field that corresponds to column #3. "0" is written in the other fields.

The same wavelength can be allocated to a pair of optical lines that corresponds to fields in which "0" is written. In this example, the same wavelength can be allocated to optical lines #1 and #2. Further, the same wavelengths can be allocated to respective pairs of optical lines #1 and #3, optical lines #1 and #6, optical lines #2 and #3, optical lines #3 and #4, and optical lines #3 and #5. Accordingly, the constraint condition is as described below.

$$x_1 + x_2 \leq 1$$

$$x_1 + x_3 \leq 1$$

$$x_1 + x_6 \leq 1$$

$$x_2 + x_3 \leq 1$$

$$x_3 + x_4 \leq 1$$

$$x_3 + x_5 \leq 1$$

This problem is one of 0/1 programming problems, and can be solved by using a branch and bound method or the like. When this problem is solved, $x_2$, $x_4$, $x_5$, and $x_6$ are 1, and $x_1$ and $x_3$ are 0. When these solutions are given to Formula (1), the following result is obtained.

$$\Sigma w_i x_i = 0 + 1 + 0 + 2 + 1 + 1 = 5$$

Namely, "5" is obtained as the maximum individual used bandwidth BwMax. Note that this calculation is performed by the maximum individual used bandwidth calculator 4.

<Sixth Embodiment>

A wavelength reallocation assist device according to a sixth embodiment can generate additional information in addition to the functions according to the first to fifth embodiments. The additional information indicates a ratio of a resource amount R0 and a resource amount R1.

The resource amount R0 represents the total amount of wavelength resources allocated to optical lines. In the example illustrated in FIG. 11, optical line #1 is established in one link. In addition, one wavelength slot is allocated to optical line #1. Here, wavelength resources allocated to optical line #1 are expressed by the product of the number of links that the optical line is established in and the bandwidth of optical line #1. The bandwidth of an optical line is expressed by the number of wavelength slots in this example. Accordingly, wavelength resources allocated to optical line #1 are 1. Similarly, wavelength resources allocated to optical lines #2, #3, #4, #5, and #6 are 1, 1, 4, 2, and 2, respectively. Accordingly, the resource amount R0 is 11.

When there is an optical line to which a wavelength slot other than wavelength slots that are used when wavelength allocation is optimized is allocated, the resource amount R1 represents the total amount of wavelength resources allocated to the optical line. The wavelength slots that are used when wavelength allocation is optimized correspond, for example, to a specified number of wavelength slots that corresponds to the maximum individual used bandwidth. In the example illustrated in FIG. 11, the maximum individual used bandwidth is 5, and it is predicted that wavelength slots S1 to S5 will be used when wavelength allocation is optimized. In this case, wavelength slot S6 corresponds to the "wavelength slot other than wavelength slots that are used when wavelength allocation is optimized". Here, wavelength slot S6 is allocated to optical line #5. Therefore, the resource amount R1 corresponds to wavelength resources allocated to optical line #5, and thus the resource amount R1 is 2.

The wavelength reallocation assist device outputs the addition information "R1/R0=2/11". Here, when a value of R1/R0 is large, it means that the usage efficiency of wavelength resources is low. Namely, when the value of R1/R0 is large, it is preferable that defrag be performed.

Figure 25:
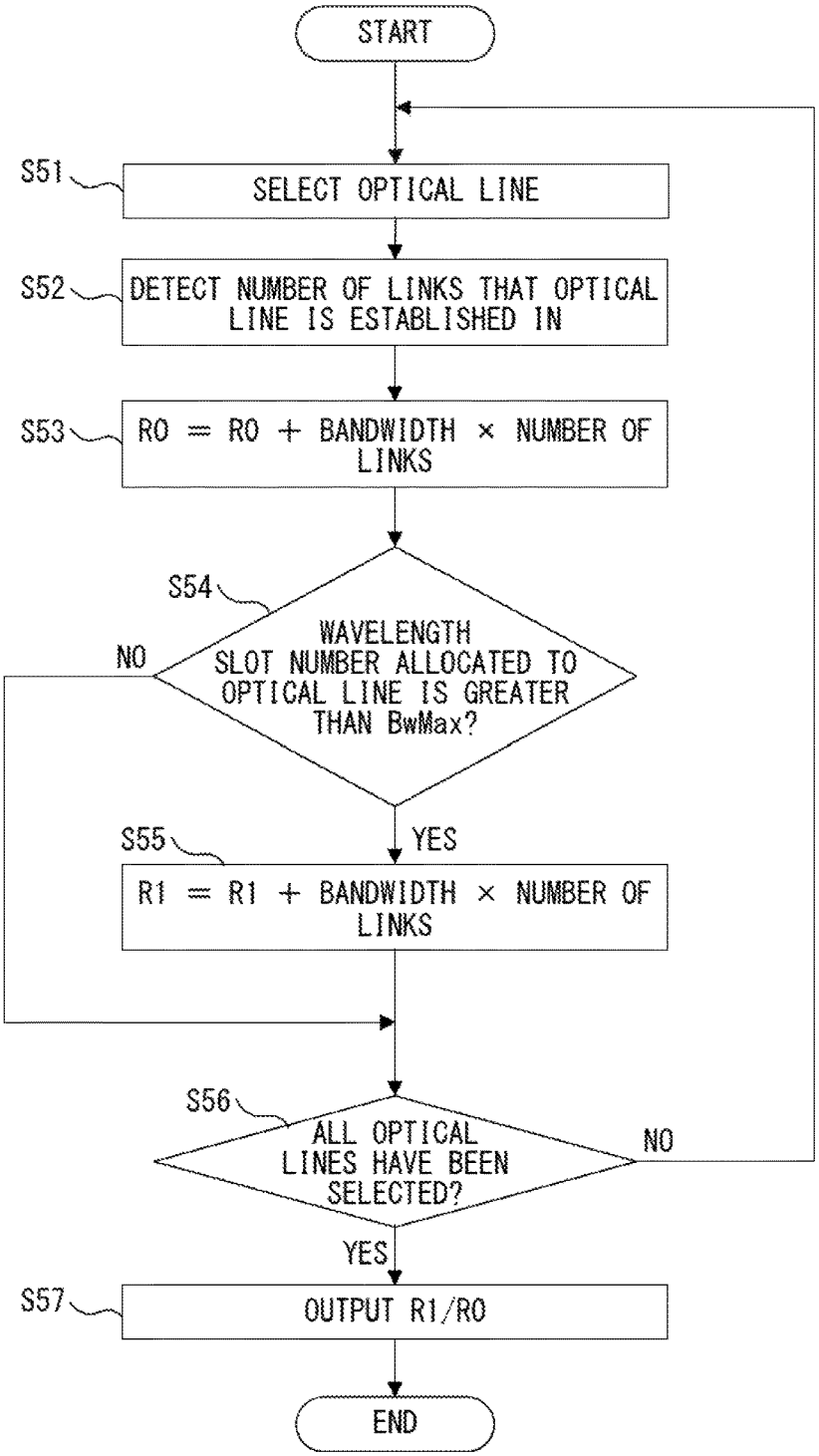
FIG. 25 is a flowchart illustrating an example of a method for generating additional information.

FIG. 25 is a flowchart illustrating an example of a method for generating additional information. The processing of this flowchart is performed by an additional information generator that is not illustrated.

In S51, the addition information generator selects an optical line. In S52, the addition information generator detects the number of links that the optical line selected in S51 is established in. In the example illustrated in FIG. 9, the number of links of each of optical lines #1 to #3 is 1, and the number of links of each of optical lines #4 to #6 is 2. In S53, the addition information generator updates a variable R0 by adding "bandwidth×number of links" to a current variable R0. The bandwidth represents the bandwidth of the selected optical line. Note that an initial value of the variable R0 is 0.

In S54, the addition information generator determines whether a slot number of a wavelength slot allocated to the selected optical line is greater than the maximum individual used bandwidth. When the wavelength slot number is greater than the maximum individual used bandwidth, the addition information generator updates a variable R1 by adding "bandwidth×number of links" to a current variable R1. When the wavelength slot number is smaller than or equal to the maximum individual used bandwidth, the process of S55 is skipped.

As an example, in the example illustrated in FIG. 11, the maximum individual used bandwidth is 5. Accordingly, the process of S55 is skipped for optical lines #1 to #4 and #6. On the other hand, wavelength slot S6 is allocated to optical line #5. Therefore, when optical line #5 is selected in S51, "bandwidth×number of links=2" is added to the variable R1 in S55. Note that an initial value of the variable R1 is 0.

Figure 26:
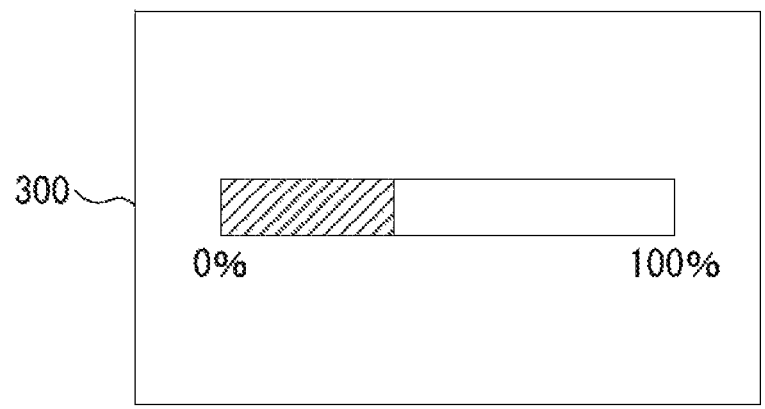
FIG. 26 illustrates a display example of additional information.

In S56, the addition information generator determines whether the processes of S52 to S55 have been performed on all of the optical lines. When there is an optical line on which the processes of S52 to S55 have not been performed, the processing of the addition information generator returns to S51. When the processes of S52 to S55 have been performed on all of the optical lines, the addition information generator outputs the addition information indicating a ratio of the resource amount R0 and the resource amount R1 in S57. The addition information is displayed, for example, on the display device 300. In this case, the ratio of the resource amount R0 and the resource amount R1 is graphically displayed, as illustrated in FIG. 26, for example. Note that a hatched region corresponds to the resources amount R1 in FIG. 26.

The additional information is displayed together with the message illustrated in FIG. 17, for example. Alternatively, the addition information may be displayed together with the usage information graph illustrated in FIG. 20A or FIG. 20B.

<Seventh Embodiment>

The wavelength allocation system 200 performs wavelength allocation according to the priority of each of the wavelength slots when the wavelength allocation system 200 allocates a wavelength slot to a requested optical line. As an example, in a case in which a plurality of wavelength slots can be allocated to a requested optical line, a wavelength slot having the smallest slot number from among the plurality of wavelength slots is allocated to the optical line. Namely, wavelength slots are allocated to optical lines in order from a wavelength slot having a smaller slot number. However, the priority of a wavelength slot is not limited to this example. As an example, wavelength slots may be allocated to optical lines in order from a wavelength slot having a larger slot number.

When the bandwidth of an optical line is large, consecutive wavelength slots are allocated to the optical line. In the example illustrated in FIG. 3, two consecutive wavelength slots are allocated to optical line #2. Accordingly, it is preferable that the priority of each of the wavelength slots be determined in such a way that the priority is reduced in order from a wavelength slot having the smallest slot number to a wavelength slot having the largest slot number, or in such a way that the priority is reduced in order from the wavelength slot having the largest slot number to the wavelength slot having the smallest slot number.

However, the processing in some of the examples above (for example, the example illustrated in FIG. 20A or FIG. 20B) is implemented under the assumption that wavelength slots are used in order from a wavelength slot having a smaller slot number. Therefore, a wavelength reallocation assist device according to a seventh embodiment includes a function of converting slot numbers of respective wavelength slots according to priority such that the examples above are realized even when the wavelength slots are used in another order.

Figure 27:
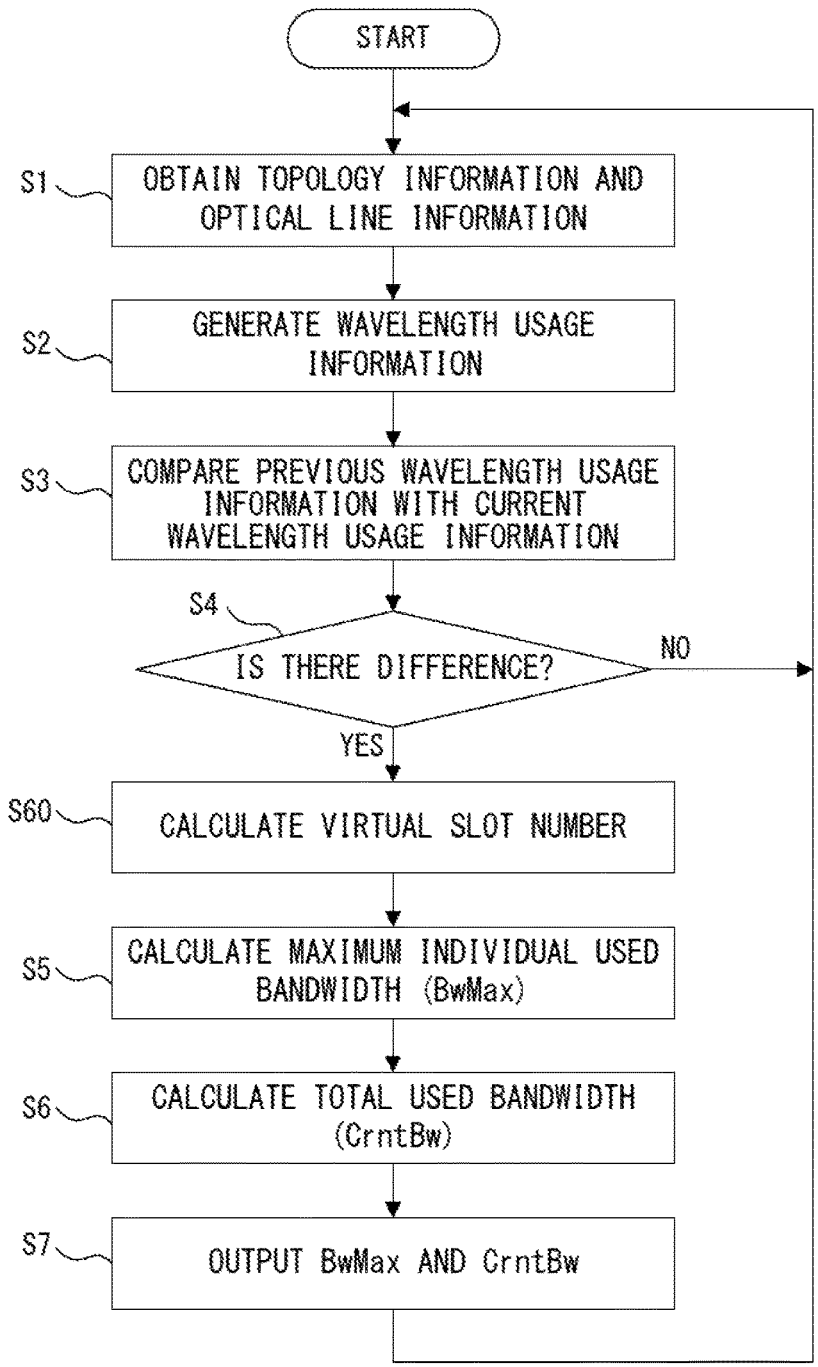
FIG. 27 is a flowchart illustrating an example of a wavelength reallocation assisting method according to a fifth embodiment.

FIG. 27 is a flowchart illustrating an example of a wavelength reallocation assisting method according to the seventh embodiment. In the example illustrated in FIG. 27, the method according to the seventh embodiment is realized by adding the process of S60 to the flowchart illustrated in FIG. 13 according to the first embodiment. However, the method according to the seventh embodiment may be realized by adding the process of S60 to the second to sixth embodiments.

Figure 28:
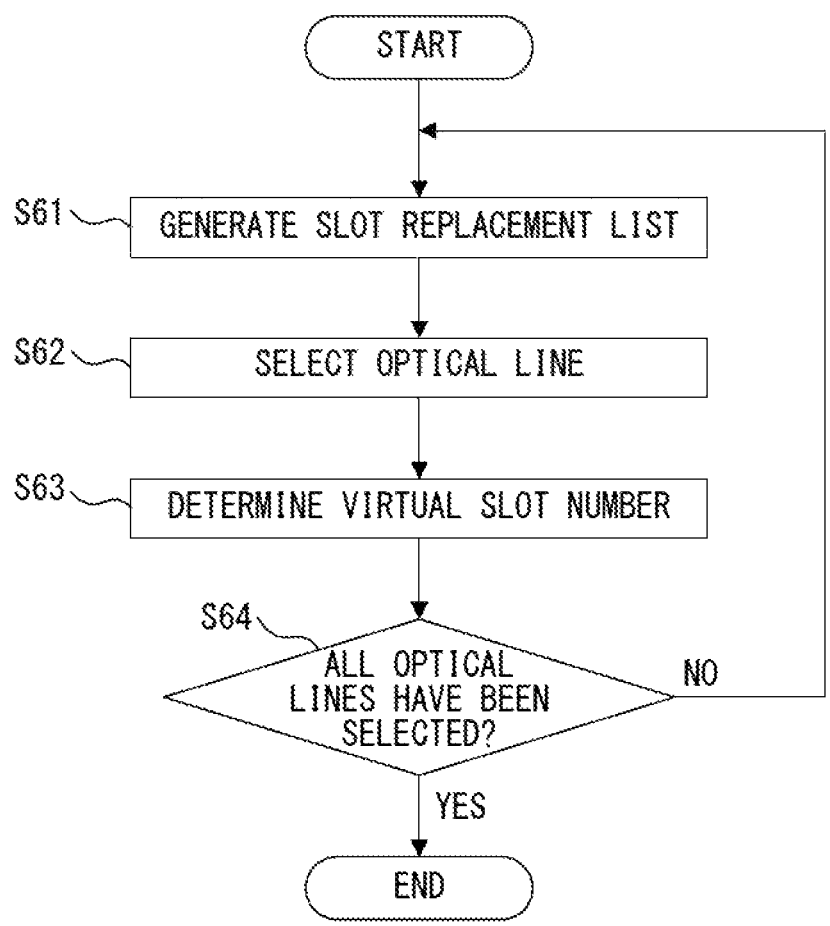
FIG. 28 is a flowchart illustrating an example of a method for calculating a virtual slot number.

In S60, a slot number converter (not illustrated) converts a slot number of a wavelength slot allocated to each of the optical lines to a virtual slot number. The slot number converter may be, for example, a portion of the function of the wavelength usage information generator 3. An example of a method for calculating the virtual slot number is illustrated in FIG. 28.

In S61, the slot number converter generates a slot replacement list. The slot replacement list is generated by using, for example, arrangement p[i]. i represents a slot number of a wavelength slot allocated to an optical line. When the priority of wavelength slot Si is j, p[i]=j is generated.

It is assumed, for example, that optical lines #1 to #6 are established in the WDM optical network, as illustrated in FIG. 9. The WDM optical network provides wavelength slots S1 to S40. It is assumed that, as a slot number increases, the priority increases. Namely, the priority of wavelength slot S40 is the highest, and the priority of wavelength slot S1 is the lowest. In this case, wavelength slots S40 to S35 are allocated to optical lines #1 to #6, as illustrated in FIG. 29A. In this case, p[40]=1, p[39]=2, p[38]=3, . . . , p[2]=39, p[1]=40 is generated as the slot replacement list.

In S62, the slot number converter selects one optical line from all of the optical lines that are established in the WDM optical network. In S63, the slot number converter converts a slot number of a wavelength slot allocated to the selected optical line to a virtual slot number by using the slot replacement list above. As an example, wavelength slot S40 is allocated to optical line #1 illustrated in FIG. 29A. In this case, when "i=40" is given to arrangement p [i], virtual slot number=1 is obtained.

In S64, the slot number converter determines whether all of the optical lines have been selected. When there is an optical line that has not been selected, the processing of the slot number converter returns to S62. Stated another way, the virtual slot number is calculated for all of the optical lines.

FIG. 29B illustrates an example of wavelength allocation that is expressed by using the virtual slot number. Then a usage information graph indicating the wavelength usage information illustrated in FIG. 29B may be displayed.

A slot number conversion function according to the seventh embodiment is useful when an interested wavelength slot is specified and is displayed on the usage information graph, for example, in the examples illustrated in FIG. 18 to FIG. 20B. Namely, the wavelength slot specifying unit 11 specifies the interested wavelength slot by using the virtual slot number. In addition, the display controller 12 arranges wavelength slots on the usage information graph in such a way that the virtual slot number increases in order from "1". The display controller 12 identifies and displays the interested wavelength slot specified by using the virtual slot number on the usage information graph. At this time, a wavelength slot that is given a virtual slot number that matches a value obtained by dividing the maximum individual used bandwidth by the bandwidth of the wavelength slot is identified and displayed as the interested wavelength slot. When the maximum individual used bandwidth is expressed by the number of wavelength slots, a wavelength slot that is given a virtual slot number that matches the maximum individual used bandwidth is identified and displayed as the interested wavelength slot. Accordingly, the wavelength reallocation assist device 100 can perform display similarly to FIG. 20A or FIG. 20B even without employing a configuration in which a wavelength slot having a smaller slot number is sequentially allocated to an optical line.

<Hardware Configuration>

Figure 30:
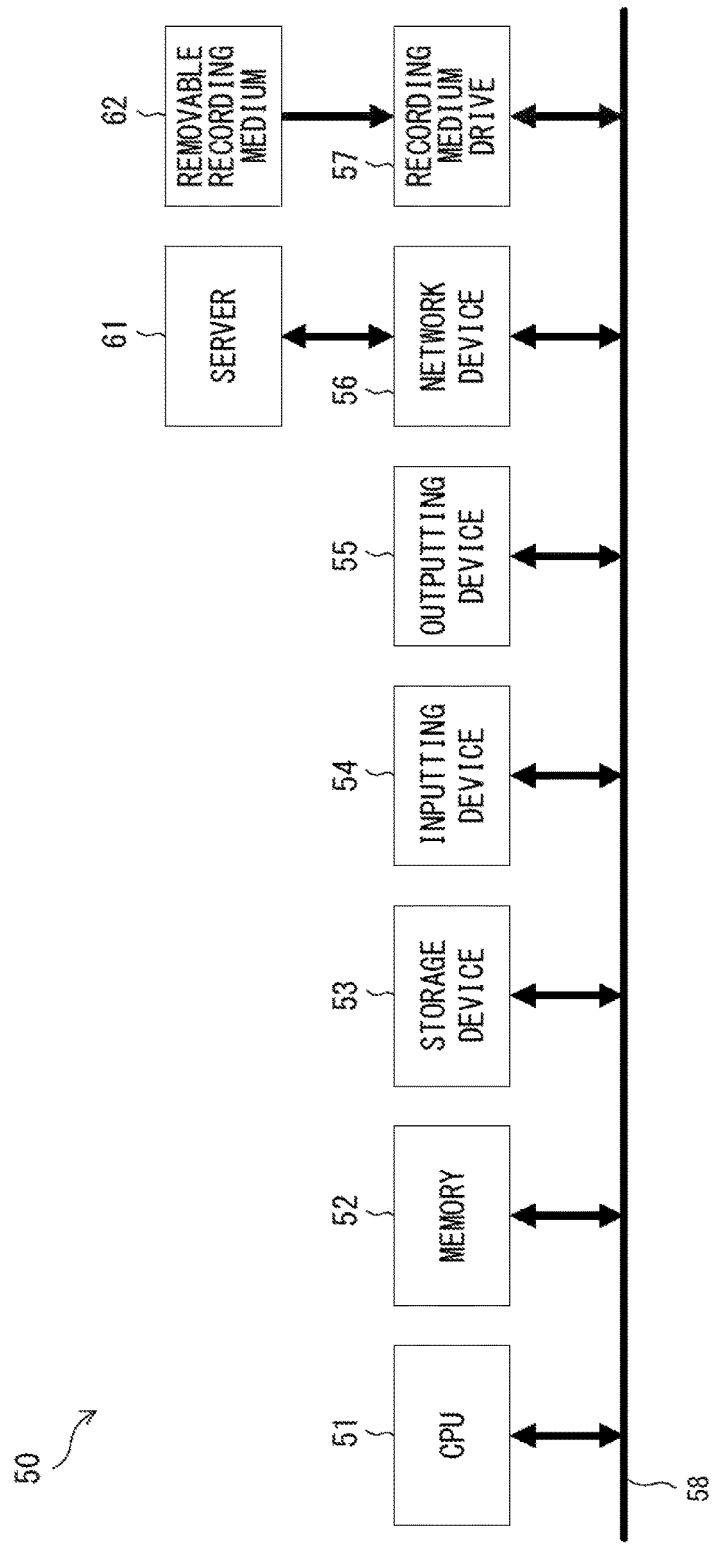
FIG. 30 illustrates an example of a hardware configuration of a wavelength reallocation assist device.

FIG. 30 illustrates an example of a hardware configuration of the wavelength reallocation assist device 100. The wavelength reallocation assist device 100 is implemented, for example, by a computer system 50 illustrated in FIG. 30. The computer system 50 includes a CPU 51, a memory 52, a storage device 53, an inputting device 54, an outputting device 55, a network device 56, and a recording medium drive 57. The CPU 51, the memory 52, the storage device 53, the inputting device 54, the outputting device 55, the network device 56, and the recording medium drive 57 are connected, for example, to a bus 58.

The CPU 51 executes a program describing the processing of the flowchart of FIG. 13, FIG. 15, FIG. 16, FIG. 19, FIG. 22, FIG. 23, FIG. 25, FIG. 27, and/or FIG. 28 by using the memory 52. Consequently, the wavelength reallocation assisting method above is realized. Namely, the CPU 51 can provide the functions of the wavelength usage information generator 3, the maximum individual used bandwidth calculator 4, the total used bandwidth calculator 5, the outputting unit 6, the wavelength slot specifying unit 11, the display controller 12, the determination unit 13, the not-illustrated addition information generator, and the not-illustrated converter. The memory 52 is, for example, a semiconductor memory, and the memory 52 is configured to include a RAM area and a ROM area. Note that variables used in the processing of each of the flowcharts are stored in the memory 52. The storage device 53 is, for example, a hard disk drive, and the storage device 53 stores the program above. In addition, the storage device 53 stores a result of the processing of each of the flowcharts. The storage device 53 may be a semiconductor memory such as a flash memory. The storage device 53 may be an external storage. The network information storage 2 illustrated in FIG. 8 or the like is configured by using the memory 52 or the storage device 53.

The inputting device 54 corresponds to a keyboard, a mouse, a touch panel, or the like that is operated by a user. The network information is input via the inputting device 54. The outputting device 55 outputs a processing result of the CPU 51. The outputting device 55 may be the display device 300 illustrated in FIG. 8 or the like.

The network device 56 can transmit and receive data via a network in accordance with an instruction of the CPU 51. Namely, the network device 56 can access a server 61 that exists on the network. The recording medium drive 57 accesses a removable recording medium 62 in accordance with an instruction of the CPU 51. The removable recording medium 62 is implemented, for example, by a semiconductor device (a USB memory or the like), a medium to/from which information is input/output by a magnetic action (a magnetic disk or the like), a medium to/from which information is input/output by an optical action (a CD-ROM, a DVD, or the like), or the like.

The program according to the embodiments is given to the computer system 50, for example, in the following forms.
(1) Installed in the storage device 53.
(2) Provided by the removable recording medium 62.
(3) Provided from the server 61.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A wavelength reallocation assisting method that provides information relating to wavelength allocation to optical lines in a wavelength division multiplexing optical network in which a plurality of nodes are connected by optical fibers, the wavelength reallocation assisting method comprising:
   detecting, by using a processor, wavelength slots used by at least one of the optical lines among a plurality of wavelength slots that are available in the wavelength division multiplexing optical network;
   calculating, by using the processor, a sum of bandwidths of the detected wavelength slots;
   outputting, by using the processor, first allocation state information that indicates the sum of bandwidths of the detected wavelength slots;
   calculating, by using the processor, individual used bandwidths with respect to the respective optical fibers, each of the individual used bandwidths indicating a sum of bandwidths of wavelength slots allocated to corresponding optical lines established in a corresponding optical fiber;
   determining, by using the processor, a maximum value of the calculated individual used bandwidths; and
   outputting, by using the processor, second allocation state information that indicates the maximum value of the calculated individual used bandwidths.

2. The wavelength reallocation assisting method according to claim 1, wherein
   the first allocation state information and the second allocation state information are displayed on a display device.

3. A wavelength reallocation assisting method that provides information relating to wavelength allocation to optical lines in a wavelength division multiplexing optical network in which a plurality of nodes are connected by optical fibers, the wavelength reallocation assisting method comprising:
   calculating, by using a processor, a sum of bandwidths of respective wavelength slots used by at least one of the optical lines among a plurality of wavelength slots that are available in the wavelength division multiplexing optical network and outputting first allocation state information that indicates the sum; and
   calculating, by using the processor, a maximum value of individual used bandwidths obtained with respect to the respective optical fibers, each of the individual used bandwidths indicating a sum of bandwidths of wavelength slots allocated to corresponding optical lines established in a corresponding optical fiber, and outputting second allocation state information that indicates the maximum value, wherein
   when a difference between the sum indicated by the first allocation state information and the maximum value indicated by the second allocation state information is greater than a specified threshold, a message to recommend reallocation of wavelength slots to optical lines that are established in the wavelength division multiplexing optical network is output.

4. A wavelength reallocation assisting method that provides information relating to wavelength allocation to optical lines in a wavelength division multiplexing optical network in which a plurality of nodes are connected by optical fibers, the wavelength reallocation assisting method comprising:
   calculating, by using a processor, a sum of bandwidths of respective wavelength slots used by at least one of the optical lines among a plurality of wavelength slots that are available in the wavelength division multiplexing optical network and outputting first allocation state information that indicates the sum; and
   calculating, by using the processor, a maximum value of individual used bandwidths obtained with respect to the respective optical fibers, each of the individual used bandwidths indicating a sum of bandwidths of wavelength slots allocated to corresponding optical lines established in a corresponding optical fiber, and outputting second allocation state information that indicates the maximum value, wherein
   when a difference between the sum indicated by the first allocation state information and the maximum value indicated by the second allocation state information is greater than a specified threshold, a reallocation process for reallocating wavelength slots to optical lines that are established in the wavelength division multiplexing optical network is started.

5. A non-transitory computer-readable recording medium having stored therein a program for causing a computer to execute a wavelength reallocation assisting process, the process comprising:
   detecting wavelength slots used by at least one of the optical lines among a plurality of wavelength slots that are available in the wavelength division multiplexing optical network;
   calculating a sum of bandwidths of the detected wavelength slots;
   outputting first allocation state information that indicates the sum of bandwidths of the detected wavelength slots;
   calculating individual used bandwidths with respect to the respective optical fibers, each of the individual used bandwidths indicating a sum of bandwidths of wavelength slots allocated to corresponding optical lines established in a corresponding optical fiber;
   determining a maximum value of the calculated individual used bandwidths; and
   outputting second allocation state information that indicates the maximum value of the calculated individual used bandwidths.

* * * * *